US012776338B2

(12) United States Patent
Nose et al.

(10) Patent No.: US 12,776,338 B2
(45) Date of Patent: Oct. 27, 2026

(54) INFORMATION PROCESSING APPARATUS, INFORMATION PROCESSING METHOD, AND NON-TRANSITORY RECORDING MEDIUM

(71) Applicants: Masaki Nose, Kanagawa (JP); Katsuyuki Omura, Tokyo (JP); Naotsugu Shinohara, Kanagawa (JP); Tohru Fukuhara, Kanagawa (JP); Noriko Takahashi, Kanagawa (JP)

(72) Inventors: Masaki Nose, Kanagawa (JP); Katsuyuki Omura, Tokyo (JP); Naotsugu Shinohara, Kanagawa (JP); Tohru Fukuhara, Kanagawa (JP); Noriko Takahashi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 568 days.

(21) Appl. No.: 18/198,848

(22) Filed: May 18, 2023

(65) Prior Publication Data

US 2023/0386508 A1 Nov. 30, 2023

(30) Foreign Application Priority Data

May 26, 2022 (JP) ................................ 2022-086243
Mar. 27, 2023 (JP) ................................ 2023-050529

(51) Int. Cl.
*G10L 25/78* (2013.01)
*G10L 15/26* (2006.01)

(52) U.S. Cl.
CPC .............. *G10L 25/78* (2013.01); *G10L 15/26* (2013.01)

(58) Field of Classification Search
CPC ............ G10L 25/78; G10L 15/26; G06F 8/34
USPC .......................................................... 704/200
See application file for complete search history.

(56) References Cited

U.S. PATENT DOCUMENTS

2022/0139373 A1 * 5/2022 Weisz ..................... G10L 15/01 704/231
2023/0120131 A1 * 4/2023 Kanungo .................. G06F 8/34 706/11

FOREIGN PATENT DOCUMENTS

| | | | |
|---|---|---|---|
| JP | 2010032861 A | * | 2/2010 |
| JP | 2010185967 A | * | 8/2010 |
| JP | 2011-221627 | | 11/2011 |
| JP | 2017-045027 | | 3/2017 |
| JP | 2019-159819 | | 9/2019 |
| JP | 2020-071675 | | 5/2020 |
| JP | 2021-076715 | | 5/2021 |

* cited by examiner

*Primary Examiner* — Md S Elahee
(74) *Attorney, Agent, or Firm* — XSENSUS LLP

(57) ABSTRACT

An information processing apparatus includes circuitry to obtain speech data, detect, from a speech represented by the speech data, an utterance section in which an utterance is made, determine whether the utterance in the utterance section satisfies one or more conditions preset for outputting a candidate for training data, and output a content of at least a part of the utterance in the utterance section as the candidate for the training data. The training data is data used for machine learning. The at least the part of the utterance is determined to satisfy the one or more conditions.

13 Claims, 17 Drawing Sheets

FIG. 3

| | TYPE OF MEETING | TIME OF MEETING (A) | TIME OF SIMULTANEOUS UTTERANCE (B) | OVERLAP PERCENTAGE (B/A) |
|---|---|---|---|---|
| MEETING A-1 | REPORT/ ANNOUNCEMENT | 50min 16s | 35.3s | 1.17% |
| MEETING A-2 | REPORT/ ANNOUNCEMENT | 14min 51s | 5.4s | 1.00% |
| MEETING B | JOURNAL CLUB | 45min 47s | 12.7s | 0.46% |
| MEETING C | REPORT/ ANNOUNCEMENT | 1h 5min 5s | 1min 30.4s | 2.32% |
| MEETING F | BRAIN-STORMING | 1h 24min 31s | 1min 28.5s | 1.75% |
| MEETING K-1 | REPORT/ ANNOUNCEMENT | 54min 43s | 1min 22.2s | 2.50% |
| MEETING K-2 | REPORT/ ANNOUNCEMENT | 55min 6s | 2min 40.9s | 4.87% |

FIG. 4

| |
|---|
| UM, ER, UH |
| SURE, YEAH, UH-HUH, UMM, WELL |
| AH, OH, YOU KNOW |
| LIKE, KIND OF, SORT OF |
| I GUESS, I SUPPOSE, LET ME SEE |
| I MEAN, SO |

FIG. 6

| START TIME | END TIME | TEXT OF UTTERANCE CONTENT |
|---|---|---|
| T1 | T2 | NICE WEATHER |
| T3 | T4 | BUT, I'M PRETTY BUSY THESE DAYS |

FIG. 7

| START TIME | END TIME | TEXT OF UTTERANCE CONTENT |
|---|---|---|
| T1 | T3 | NICE WEATHER, HOW HAVE YOU BEEN LATELY? |
| T2 | T4 | YEAH, THE WEATHER MAKES ME FEEL GOOD,<br>BUT, I'M PRETTY BUSY THESE DAYS |

FIG. 8

| START TIME | END TIME | TEXT OF UTTERANCE CONTENT |
|---|---|---|
| T1 | T2 | NICE WEATHER, |
| T2 | T3 | HOW HAVE YOU BEEN LATELY? |
| T2 | T3 | YEAH, THE WEATHER MAKES ME FEEL GOOD |
| T3 | T4 | BUT, I'M PRETTY BUSY THESE DAYS |

FIG. 15

280

| UTTERANCE ID | START TIME | END TIME | TEXT |
|---|---|---|---|
| 0010 | 00:22:39:600 | 00:22:41:651 | WE STILL HAVE A PROBLEM TO SOLVE |
| 0011 | 00:22:41:651 | 00:22:41:922 | YES |
| 0012 | 00:22:41:922 | 00:22:44:598 | THE PROBLEM IS THE ONE WE RECEIVE AN INQUIRY THROUGH HOME'S |
| 0013 | 00:22:44:789 | 00:22:45:565 | UM YES |
| 0014 | 00:22:45:671 | 00:22:46:330 | MAILS ARE |
| 0015 | 00:22:46:223 | 00:22:46:840 | TRANSFERRED |
| 0016 | 00:22:46:877 | 00:22:47:183 | YES |
| 0017 | 00:22:47:365 | 00:22:48:073 | YEAH YEAH |

FIG. 17

171 172 173

SELECT TRAINING DATA

| FLAG | UTTERANCE ID (REPRODUCE) | START TIME | END TIME | TEXT | SELECT |
|---|---|---|---|---|---|
| 1 | 0010 | 00:22:39:600 | 00:22:41:651 | WE STILL HAVE A PROBLEM TO SOLVE | ✓ |
| | 0011 | 00:22:41:651 | 00:22:41:922 | YES | |
| 1 | 0012 | 00:22:41:922 | 00:22:44:598 | THE PROBLEM IS THE ONE WE RE- CEIVE AN INQUIRY THROUGH HOME'S | ✓ |
| | 0013 | 00:22:44:789 | 00:22:45:565 | UM YES | |
| 1 | 0014 | 00:22:45:671 | 00:22:46:330 | MAILS (ARE) | ✓ |
| | 0015 | 00:22:46:223 | 00:22:46:840 | TRANSFERRED | |
| 1 | 0016 | 00:22:46:877 | 00:22:47:183 | YES | |
| | 0017 | 00:22:47:365 | 00:22:48:073 | YEAH YEAH | ✓ |

PREVIOUS PAGE ◁ 3/25 ▷ NEXT PAGE 174

INFORMATION PROCESSING APPARATUS, INFORMATION PROCESSING METHOD, AND NON-TRANSITORY RECORDING MEDIUM

CROSS-REFERENCE TO RELATED APPLICATIONS

This patent application is based on and claims priority pursuant to 35 U.S.C. § 119(a) to Japanese Patent Application Nos. 2022-086243, filed on May 26, 2022, and 2023-050529, filed on Mar. 27, 2023, in the Japan Patent Office, the entire disclosure of which is hereby incorporated by reference herein.

BACKGROUND

Technical Field

Embodiments of the present disclosure relate to an information processing apparatus, an information processing method, and a non-transitory recording medium.

Related Art

In the related art, a technique of generating a speech-language corpus, by using speech in a specific program (speech data), subtitle text attached for the program in advance, and a transcription of the speech in the program, is known. The known technique uses the speech-language corpus for learning an acoustic model to be used for speech recognition.

In such a related art, the speech data of the program is used to support the generation of training data including labeled training data.

SUMMARY

According to an embodiment of the present disclosure, an information processing apparatus includes circuitry to obtain speech data, detect, from a speech represented by the speech data, an utterance section in which an utterance is made, determine whether the utterance in the utterance section satisfies one or more conditions preset for outputting a candidate for training data, and output a content of at least a part of the utterance in the utterance section as the candidate for the training data. The training data is data used for machine learning. The at least the part of the utterance is determined to satisfy the one or more conditions.

According to an embodiment of the present disclosure, an information processing method includes obtaining speech data, detecting, from a speech represented by the speech data, an utterance section in which an utterance is made, determining whether the utterance in the utterance section satisfies one or more conditions preset for outputting a candidate for training data, and outputting a content of at least a part of the utterance in the utterance section as the candidate for the training data. The training data is data used for machine learning. The at least the part of the utterance is determined to satisfy the one or more conditions.

According to an embodiment of the present disclosure, a non-transitory recording medium storing a plurality of instructions which, when executed by one or more processors of an information processing apparatus, causes the processors to perform a method. The method includes obtaining speech data, detecting, from a speech represented by the speech data, an utterance section in which an utterance is made, determining whether the utterance in the utterance section satisfies one or more conditions preset for outputting a candidate for training data, and outputting a content of at least a part of the utterance in the utterance section as the candidate for the training data. The training data is data used for machine learning. The at least the part of the utterance is determined to satisfy the one or more conditions.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 3 is a diagram illustrating a table for describing the simultaneous utterance according to the exemplary embodiment of the disclosure;

FIG. 4 is a diagram for describing back-channel responses and fillers according to the exemplary embodiment of the disclosure;

FIG. 6 is a diagram illustrating a table for describing exclusion of simultaneous utterance from speech data according to the exemplary embodiment of the disclosure;

FIG. 7 is a diagram illustrating a table that is a comparative example according to the exemplary embodiment of the disclosure;

FIG. 8 is a diagram illustrating another table for describing exclusion of simultaneous utterance from speech data according to the exemplary embodiment of the disclosure;

FIG. 15 is a diagram illustrating an example of a recognition result data storage unit according to the exemplary embodiment of the disclosure;

FIG. 17 is a diagram illustrating an example of display of candidates for training data according to the exemplary embodiment of the disclosure;

Figure 1:
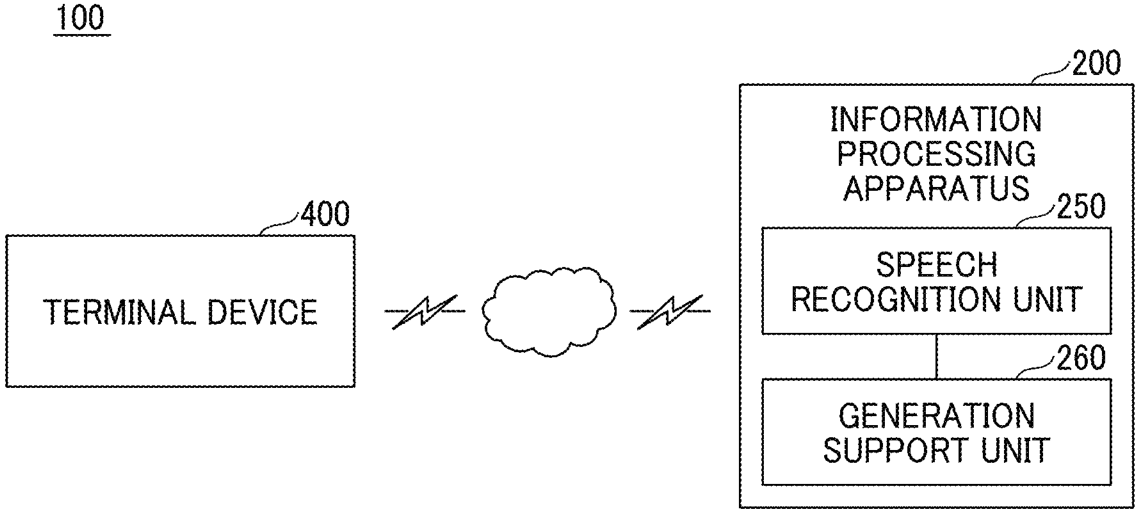
FIG. 1 is a diagram illustrating an example of a system configuration of an information processing system according to an exemplary embodiment of the disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Embodiments of the present disclosure are described below with reference to the drawings. FIG. 1 is a diagram illustrating an example of a system configuration of an information processing system according to an exemplary embodiment.

An information processing system 100 according to the present embodiment includes an information processing apparatus 200 and a terminal device 400, which are connected to each other via a network, for example.

The information processing apparatus 200 according to the present embodiment may be a general computer, and includes a speech recognition unit 250 and a generation support unit 260. The speech recognition unit 250 acquires speech data, performs speech recognition processing on the acquired speech data, and acquires a character string converted from the speech data.

In the following description, the data acquired by performing speech recognition processing on speech data may be referred to as recognition result data. The recognition result data is, for example, data in which an utterance identifier (ID), which is identification information for identifying an utterance included in the speech data, a start time of an utterance section during which the utterance is made, an end time of the utterance section, and a character string (text) converted from the speech data of the utterance section are associated with each other.

In the following description, a content of an utterance of an utterance section includes at least one of speech data of the utterance section and a character string converted from the speech data of the utterance section. The content of an utterance may be referred to as an utterance content. In other words, the utterance content of the utterance section is included in the recognition result data, which is a result of speech recognition processing performed on the speech data of the utterance section.

The generation support unit 260 supports generation of training data including labeled training data for improving the accuracy of the speech recognition processing by using the recognition result data. The training data according to the present embodiment is training data for causing a speech recognition model to perform machine learning. The training data includes labeled training data.

Specifically, the generation support unit 260 specifies, as a candidate for the training data, recognition result data of which the utterance in the utterance section satisfies one or more conditions preset, from among the recognition result data for each utterance section. Then, the generation support unit 260 causes the terminal device 400 to display a list of recognition result data specified as candidates for the training data.

The terminal device 400 may be, for example, a tablet terminal, a smartphone, or a general computer similar to the information processing apparatus 200, and may be mainly used by a worker, such as an annotator, who generates the training data.

When recognition result data is selected from the list of recognition result data displayed on the terminal device 400, the information processing apparatus 200 generates the training data based on the selected recognition result data.

Accordingly, in the present embodiment, the worker who generates the training data can generate the training data for improving the accuracy of the speech recognition processing by selecting the recognition result data to be used for generating the training data from the recognition result data set to the candidates for the training data.

In the example illustrated in FIG. 1, the information processing apparatus 200 includes the speech recognition unit 250 and the generation support unit 260, but is not limited thereto. Each of the speech recognition unit 250 and the generation support unit 260 may be implemented by an independent device. Specifically, for example, the speech recognition unit 250 may be implemented by a speech recognition device that is different from the information processing apparatus 200.

The focuses of the present embodiment are described.

Figure 2:
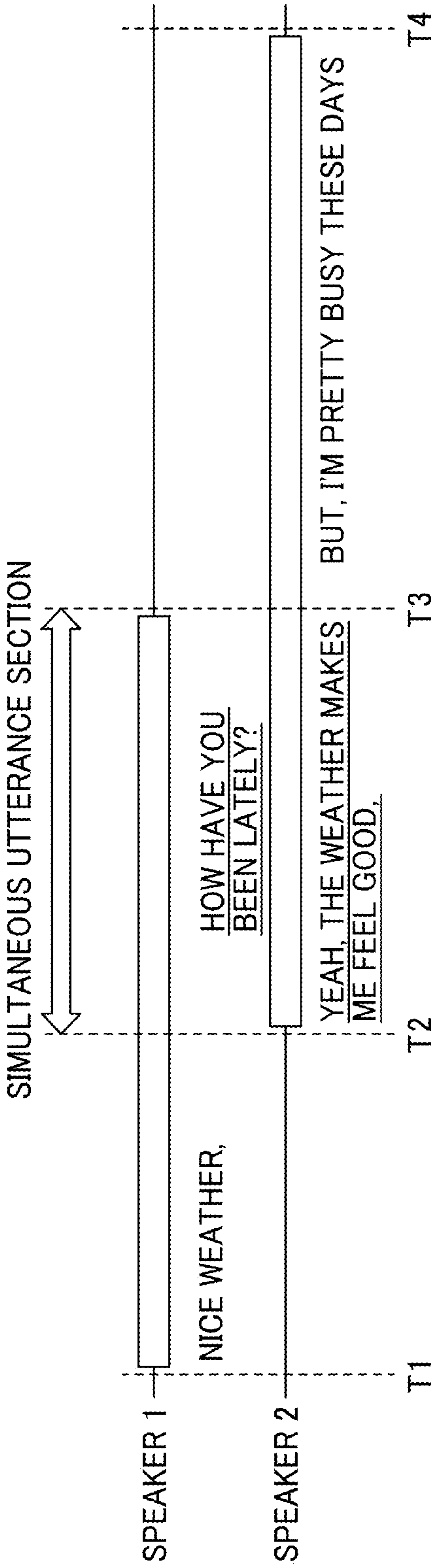
FIG. 2 is a diagram for describing simultaneous utterance according to the exemplary embodiment of the disclosure.
Figure 5A:
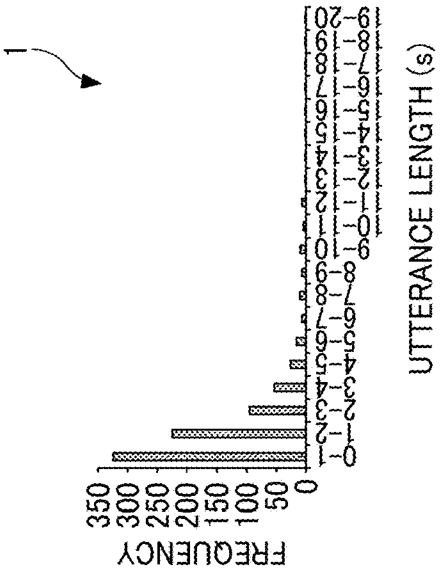
FIGS. 5A to 5F are graphs for describing back-channel responses and fillers according to the exemplary embodiment of the disclosure.
Figure 5B:
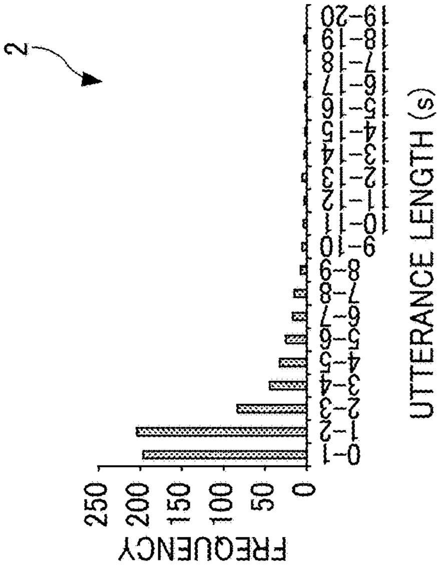
Figure 5C:
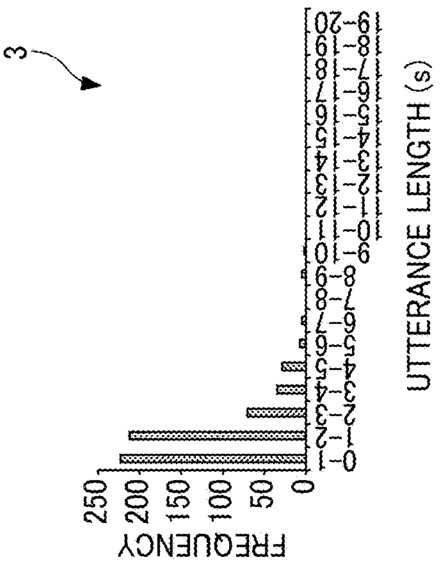
Figure 5D:
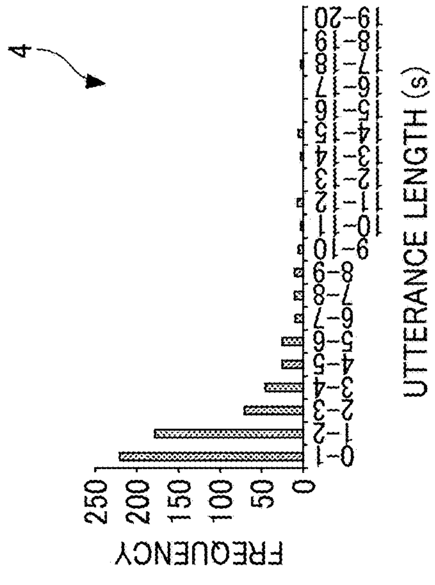
Figure 5E:
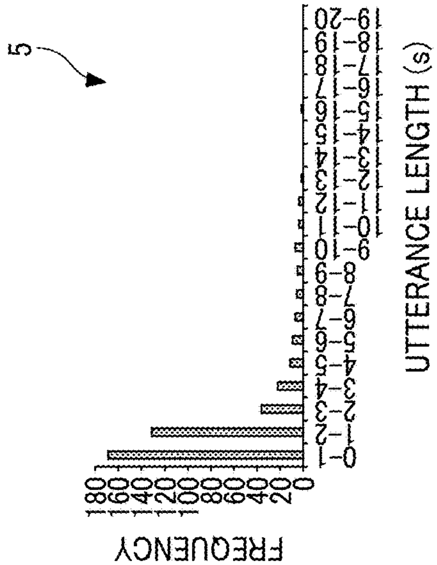
Figure 5F:
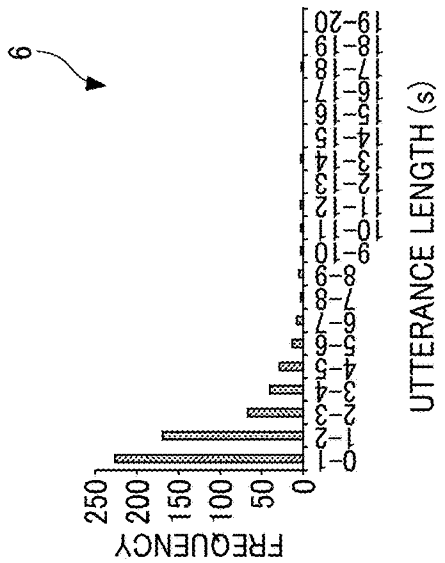

FIG. 2 is a diagram for describing simultaneous utterance according to the present embodiment. FIG. 3 is a diagram illustrating a table for describing the simultaneous utterance according to the present embodiment. FIG. 2 is a diagram illustrating a case example where the utterance of a speaker 1 and the utterance of a speaker 2 partially overlap each other.

In the example of FIG. 2, an utterance section of the speaker 1 is a section from a timing T1 to a timing T3, and an utterance section of the speaker 2 is a section from a timing T2 to a timing T4. In the section from the timing T2 to the timing T3, the utterance of the speaker 1 and the utterance of the speaker 2 overlap each other.

In the present embodiment, such overlapping of utterances of a plurality of speakers may be referred to as simultaneous utterance.

Such an overlapping section, namely a simultaneous utterance section, frequently occurs in, for example, a meeting in which a plurality of participants participates. FIG. 3 is a diagram illustrating an example of the proportion of time with simultaneous utterance (a period of time during which simultaneous utterance occurs) to the total meeting time in each of various types of meetings. Note that the meeting time indicates a period of time from the start to the end of recording of speech data.

As illustrated in FIG. 3, in the case of a general meeting, the proportion of time with simultaneous utterance to the entire utterance is less than 5% of time of the entire utterance as illustrated in FIG. 3.

However, since learning data for speech recognition is in units of sentences (one meaningful utterance), for example, even if the time of the simultaneous utterance is extremely short, the part can adversely affect the learning of the entire sentence, and the entire sentence may not be suitable for learning in some cases.

FIG. 4 is a diagram for describing back-channel responses and fillers according to the exemplary embodiment. FIG. 5A to 5F are graphs for describing back-channel responses and fillers.

In spoken words between persons in a meeting, fillers and back-channel responses are often used. As illustrated in FIG. 4, the filler is a word for filling pauses or gaps in speech, such as "ah" and "well," and includes an interjection, which is a word or a phrase uttered to express a feeling, such as shock of disappointment, for example.

Although the influence of the fillers in the learning for speech recognition can be substantially ignored, the fillers are unnecessary information in the training data.

On the other hand, since the back-channel responses indicate an intention of the recipient, the back-channel responses can be meaningful in the training data. However, since the back-channel responses are used more than necessary, checking all the back-channel responses takes a lot of time and effort for the worker.

FIGS. 5A to 5F are graphs in each of which an utterance length in one of a plurality of types of meetings is indicated by a histogram. As illustrated in FIGS. 5A to 5F, the frequency of an utterance having an utterance length less than one second is the highest in all types of meetings illustrated in histograms 1 to 6. An utterance having an utterance length less than one second strongly indicates that the utterance includes a back-channel response.

As described above, in a conversation between persons, a monotonous utterance such as a back-channel response is frequently made, and reviewing all of the speech data can be burdensome for the workers.

In the present embodiment, focusing on these points, among the recognition result data for each utterance section included in the speech data obtained by recording a conversation of a plurality of persons, the recognition result data of the utterance section of an utterance corresponding to simultaneous utterance, a back-channel response, or a filler is excluded from the candidates for the training data. In the present embodiment, by selecting the candidates for the training data, as described above, the burdensome of the worker to generate the training data can be reduced. In other words, in the present embodiment, the training data can be efficiently generated.

Note that speech data obtained by recording a conversation between the plurality of persons in the present embodiment may be speech data recorded in a state where the distance between the mouth of a speaker and a microphone is equal to or greater than a certain distance.

In the following description, such a state in which or a range of which a distance between the mouth of a speaker and a microphone is equal to or greater than a certain distance may be referred to as a "Far Field." In the following description, speech data acquired in a state where the distance between the mouth of a speaker and a microphone that acquires the speech data is equal to or greater than a certain distance may be referred to as speech data acquired in a far field.

A method of acquiring speech data is described in detail later.

Referring to FIGS. 6 to 8, a case in which simultaneous utterance is excluded from speech data and a comparative example are described.

FIG. 6 is a diagram illustrating a table for describing exclusion of simultaneous utterance from speech data. In FIG. 6, excluding simultaneous utterance is described with reference to the example of FIG. 2.

In the example of FIG. 2, the utterance section of the speaker 1 is a section from the timing T1 to the timing T3, and the utterance section of the speaker 2 is a section from the timing T2 to the timing T4. In addition, a section of the simultaneous utterance of the speaker 1 and the speaker 2 is a section from the timing T2 to the timing T3.

Accordingly, in the present embodiment, the recognition result data of the utterance section in which the utterance does not overlap is extracted from the recognition result data of all utterance sections that is from the timing T1 to the timing T4 in the speech data, and is set to the candidate for the training data. In the following description, an utterance that does not overlap with another utteranceutteranceutteranceutteranceutteranceutteranceutteranceutterance of another speaker is referred to as a solo utterance.

FIG. 7 is a diagram illustrating a table that is a comparative example. FIG. 7 illustrates a case where speech recognition processing is performed on the section from the timing T1 to the timing T3 (the utterance section of the speaker 1) and the section from the timing T2 to the timing T4 (the utterance section of the speaker 2).

In this case, each of the speech data in the section from the timing T1 to the timing T3 (the utterance section of the speaker 1) and the speech data in the section from the timing T2 to the timing T4 (the utterance section of the speaker 2) includes the simultaneous utterance.

In the speech data including the simultaneous utterance, a phoneme is unclear, and a character string acquired by speech recognition may be inaccurate. In addition, in a case that the speech recognition processing is performed on the speech data including the simultaneous utterance, the phoneme is unclear, and thus there is a high possibility that the utterance content included in the recognition result data is inaccurate. For this reason, even in a case of training with the speech recognition model using the recognition result data as the training data, there is a possibility that the training does not contribute to the improvement of the accuracy of the speech recognition. In addition, the technique of separating the simultaneous utterance into utterances each of which is a solo utterance is also difficult, resulting in difficulty in ensuring high accuracy.

FIG. 8 is a diagram for describing exclusion of simultaneous utterance from speech data. In the present embodiment, the recognition result data of the utterance section that is from the timing T1 to the timing T2 and the recognition result data of the utterance section that is from the timing T3 to the timing T4, each of which is a solo utterance, are set to candidates for the training data.

In addition, in the present embodiment, the recognition result data of the utterance section that is from the timing T2 to the timing T3, which is the simultaneous utterance of the speaker 1 and the speaker 2, is excluded from the candidates for the training data.

In this way, in the present embodiment, the recognition result data in which the speech data having a clear phoneme and a character string acquired by highly accurate speech recognition processing are associated with each other, and the recognition result data can be set to a candidate for training data and presented to the worker who generates the training data.

Referring to FIGS. 9A, 9B, 10A, and 10B, a description is given of the exclusion of a back-channel response and a filler from speech data.

Figure 9A:
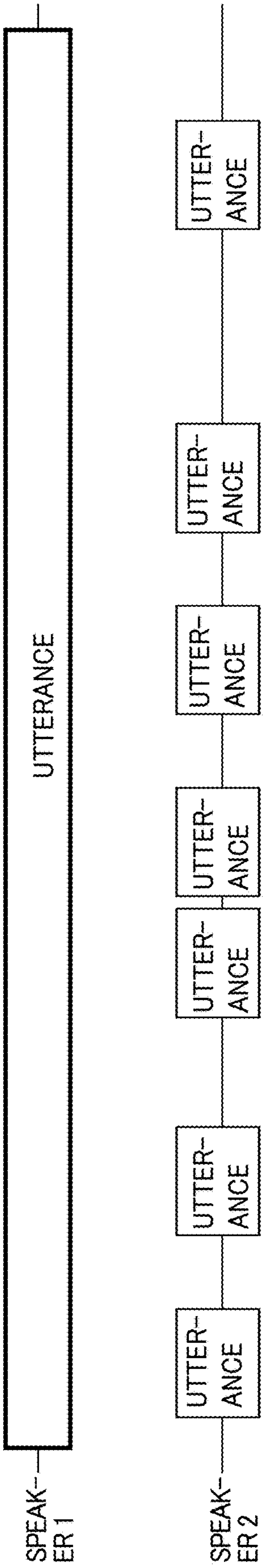
FIGS. 9A and 9B are diagrams for describing exclusion of a back-channel response and a filler from speech data according to the exemplary embodiment of the disclosure.
Figure 9B:
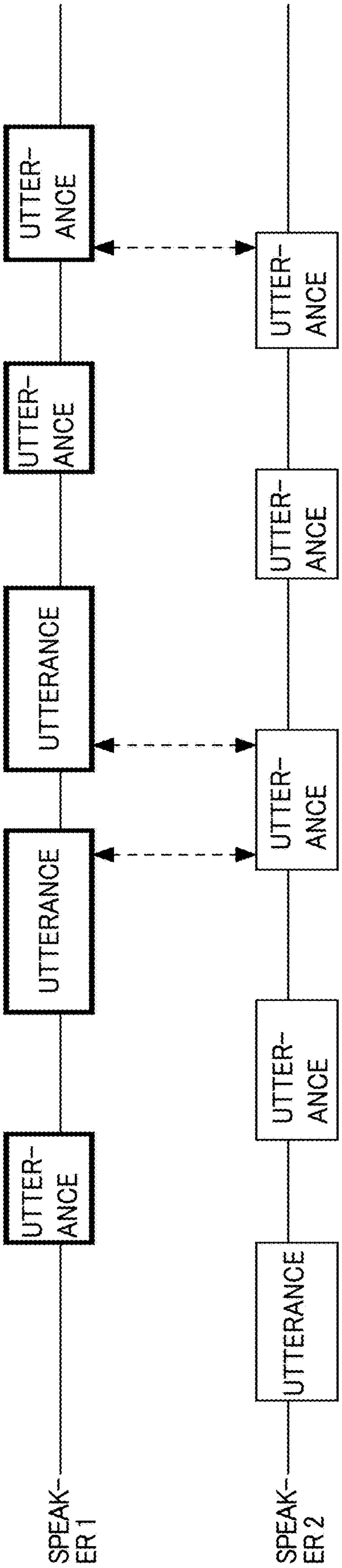

FIGS. 9A and 9B are diagrams for describing exclusion of a back-channel response and a filler from speech data. FIG. 9A illustrates a case w % here the speaker 2 sporadically makes a back-channel response or a short utterance (filler) during the utterance of the speaker 1. FIG. 9B illustrates a case where the speaker 2 returns a response or a short utterance (filler) to the speaker 1 who is a main speaker. In the description of embodiments, for example, the main speaker is a speaker who provides a topic of conversation.

In the example of FIG. 9A, the back-channel response and the filler of the speaker 2 overlap with the utterance of the speaker 1. However, as described above, since the back-channel responses or the fillers are frequently made during the conversation, if an utterance section in which a back-channel response or a filler overlaps is determined as simultaneous utterance and excluded from the candidates for the training data, an amount of data of the recognition result data to be candidates for the training data is significantly reduced. In addition, a back-channel response or a filler overlapping with the utterance of the main speaker can be regarded as noise.

Accordingly, in the present embodiment, when the utterance of the speaker 1 and a back-channel response or a filler of the speaker 2 overlap with each other, the utterance is not regarded as the simultaneous utterance, and the recognition result data acquired by performing speech recognition processing on the speech data of a back-channel response alone or a filler alone is excluded from the candidates for the training data.

Specifically, in the present embodiment, recognition result data corresponding to the speech data indicating the utterance of the speaker 1 (the main speaker) alone in FIG. 9A is set to a candidate for the training data, and recognition result data corresponding to the speech data indicating the back-channel response or the filler, which is the utterance of the speaker 2, is excluded from the candidates for the training data.

Accordingly, in the example of FIG. 9A, the recognition result data of the utterance sections of the speaker 1 alone is set to the candidate for the training data.

In addition, in the present embodiment, as illustrated in FIG. 9B, when a back-channel response or a filler made by the speaker 2 is continuously made with respect to the speaker 1, who is the main speaker, recognition result data corresponding to the speech data indicating the back-channel response or the filler, which is isolated, is excluded from the candidates for the training data.

Specifically, in the present embodiment, the recognition result data of the utterance sections of the speaker 1, who is the main speaker, alone in FIG. 9B is set to the candidate for the training data, and the recognition result data of the utterance sections of the speaker 2 is excluded from the candidates for the training data.

In addition, in the present embodiment, the recognition result data corresponding to the speech data corresponding to the isolated back-channel response in the conversation or the isolated filler is also excluded from the candidates for the training data.

Figure 10A:
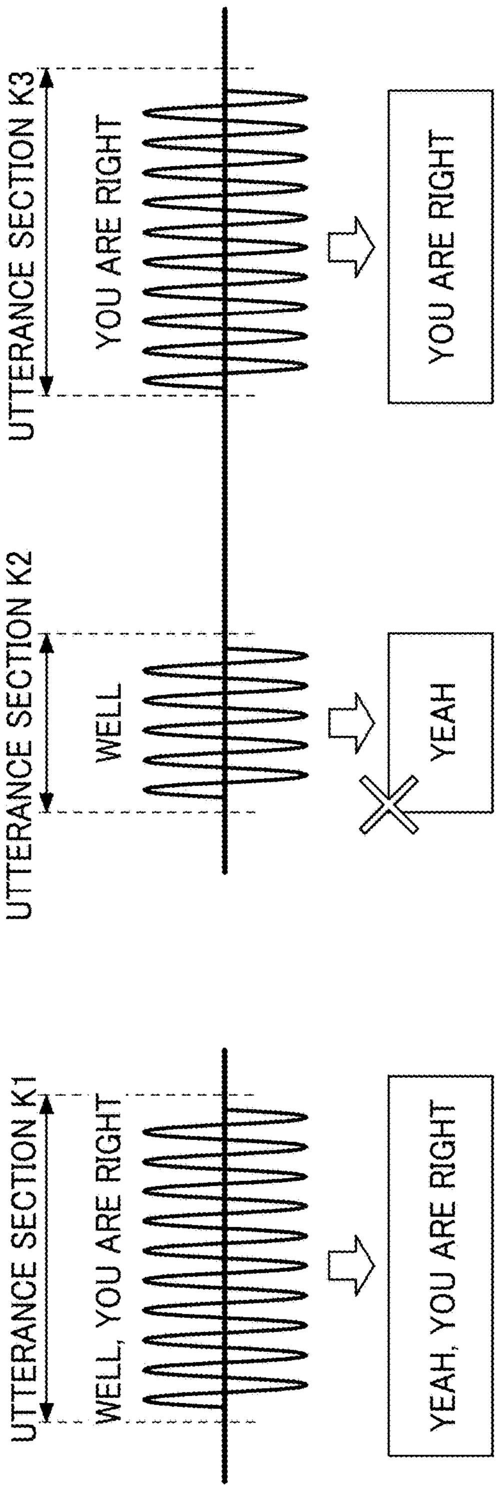
FIGS. 10A and 10B are diagrams for describing an isolated back-channel response and an isolated filler according to the exemplary embodiment of the disclosure.
Figure 10B:
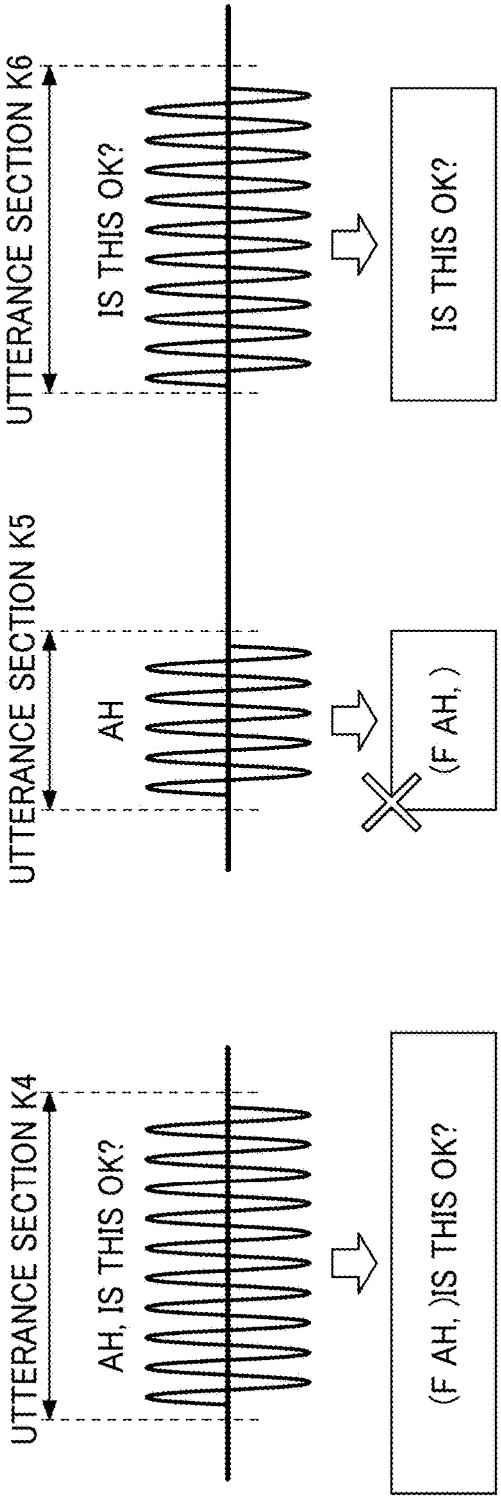

Referring to FIGS. 10A and 10B, an isolated back-channel response and an isolated filler are described. FIGS. 10A and 10B are diagrams for describing an isolated back-channel response and an isolated filler according to the present embodiment. FIG. 10A is a diagram illustrating an isolated back-channel response, and FIG. 10B is a diagram illustrating an isolated filler.

In the present embodiment, an isolated back-channel response or an isolated filler refers to a state in which there is no utterance other than the filler or the back-channel response in an utterance section in which utterances are sequentially made.

As illustrated in FIG. 10A, the utterance content in an utterance section K1 is "YEAH, YOU ARE RIGHT," and the utterance of "YOU ARE RIGHT" is also included in addition to a back-channel response, "YEAH." Accordingly, the recognition result data of the utterance section K1 is a candidate for the training data.

In addition, the utterance content in an utterance section K2 is "YEAH," and the utterance content in an utterance section K3 is "YOU ARE RIGHT." In this case, the utterance content of the utterance section K2 is a back-channel response alone, does not include any other utterances, or any other types of utterances. Accordingly, the utterance content of the utterance section K2 is regarded as an isolated back-channel response. Accordingly, the recognition result data of the utterance section K2 is excluded from the candidates for the training data.

In addition, in FIG. 10B, the utterance content in an utterance section K4 is "AH, IS THIS OK?" and the utterance "IS THIS OK?" is also included in addition to the filler "AH." Accordingly, the recognition result data of the utterance section K4 is set to a candidate for the training data.

In addition, the utterance content in an utterance section K5 is "AH", and the utterance content in an utterance section K6 is "IS THIS OK?" In this case, the utterance content of the utterance section K5 is a filler alone, and does not include any other utterances, or any other types of utterance. Accordingly, the utterance content of the utterance section K5 is regarded as an isolated filler. Accordingly, the recognition result data of the utterance section K5 is excluded from the candidates for the training data.

As described above, in the present embodiment, recognition result data of the utterance section of which speech data satisfies a specific condition among the speech data obtained by speech recordings of utterances made by a plurality of persons is set to a candidate for the training data. In other words, in the present embodiment, utterance content of an utterance section satisfying one or more conditions (specific conditions) set in advance among utterances made by the plurality of persons is set to a candidate for the training data. The one or more specific conditions may be set in advance by a user of the information processing system 100. The user of the information processing system 100 may be, for example, an administrator of the information processing apparatus 200, or may be a user of the terminal device 400 (a worker who generates the training data).

The specific condition is any one of the following conditions.

- The utterance is an utterance of a main speaker and is a solo utterance with which one or more utterances made by one or more of a plurality of persons do not overlap (referred to as a condition 1 in the following).
- The utterance is not an utterance of a main speaker and is not an utterance including an isolated back-channel response alone or an isolated filler alone (referred to as a condition 2 in the following).
- The utterance is an utterance of a main speaker and includes simultaneous utterance as a part of the utterance and a solo utterance as a part of the utterance (referred to as a condition 3 in the following).

In the present embodiment, the recognition result data of an utterance section satisfying any one of the conditions described above is set to a candidate for the training data.

Figure 11:
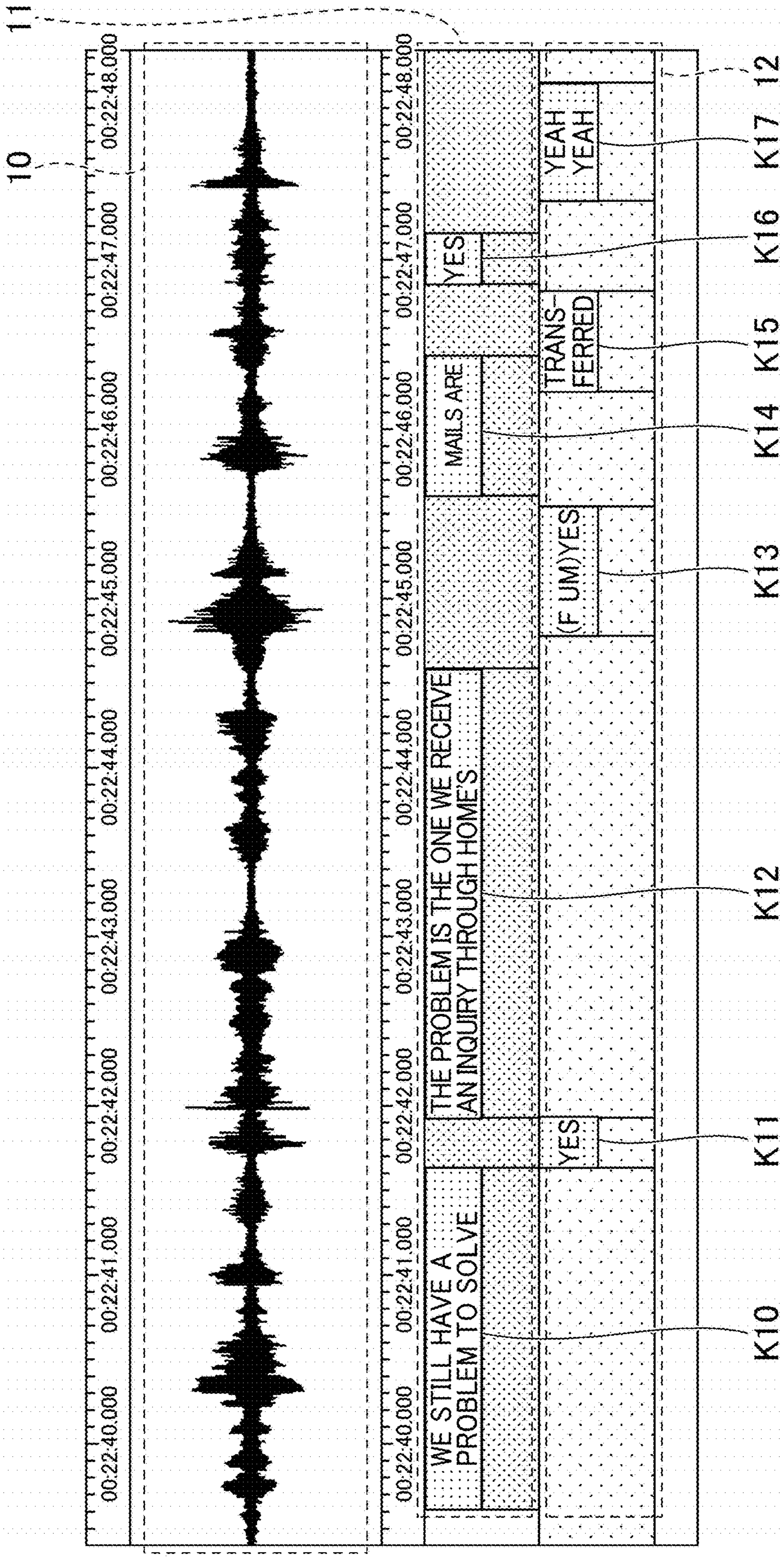
FIG. 11 is a diagram illustrating a relationship between speech data and an utterance section that satisfies a specific condition according to the exemplary embodiment of the disclosure.

Referring to FIG. 11, a relationship between speech data obtained by speech recordings of utterances of a plurality of persons and an utterance section regarded as satisfying a specific condition is specifically described below.

FIG. 11 is a diagram illustrating a relationship between speech data and an utterance section that satisfies a specific condition according to the present embodiment.

In FIG. 11, a speech waveform 10 indicated by speech data obtained by speech recordings of utterances of the plurality of persons and a character string converted from the speech data for each utterance section are associated with each other. In FIG. 11, an area 11 indicates the utterance of the speaker 1 who is the main speaker, and an area 12 indicates the utterance of the speaker 2 who is not the main speaker.

In FIG. 11, utterance sections K10 and K12 of the speaker 1 satisfy the condition 1 among the specific conditions. Accordingly, the recognition result data of each of the utterance sections K10 and K12 is a candidate for the training data. An utterance section K14 of the speaker 1 partially overlaps with an utterance section K15 of the speaker 2. Accordingly, in the present embodiment, a part of the utterance section K14 that does not overlap with the utterance section K15 is an utterance section satisfying the condition 3. In addition, the recognition result data of the utterance section is set to a candidate for the training data.

In addition, the utterance content of an utterance section K16 of the speaker 1 is a back-channel response, but satisfies the condition 1. Accordingly, the recognition result data of the utterance section K16 is set to a candidate for the training data.

In addition, in FIG. 11, each of utterance sections K11, K13, and K17 corresponds to an isolated back-channel response made by the speaker 2 and does not satisfy any of the conditions 1 to 3, which are specific conditions. Accordingly, the recognition result data of each of the utterance sections K11, K13, and K17 is excluded from the candidates for the training dataset.

In addition, the utterance section K15 includes simultaneous utterance and does not satisfy any of the conditions 1 to 3, which are specific conditions. Accordingly, the recognition result data of the utterance section K15 is excluded from the candidates for the training data.

As described above, in the information processing system 100 according to the present embodiment, the information processing apparatus 200 specifies recognition result data to be a candidate for the training data and causes the terminal device 400 to display the candidate for the training data. Then, the information processing apparatus 200 according to the present embodiment generates the training data using the recognition result data selected by the user of the terminal device 400.

Figure 12:
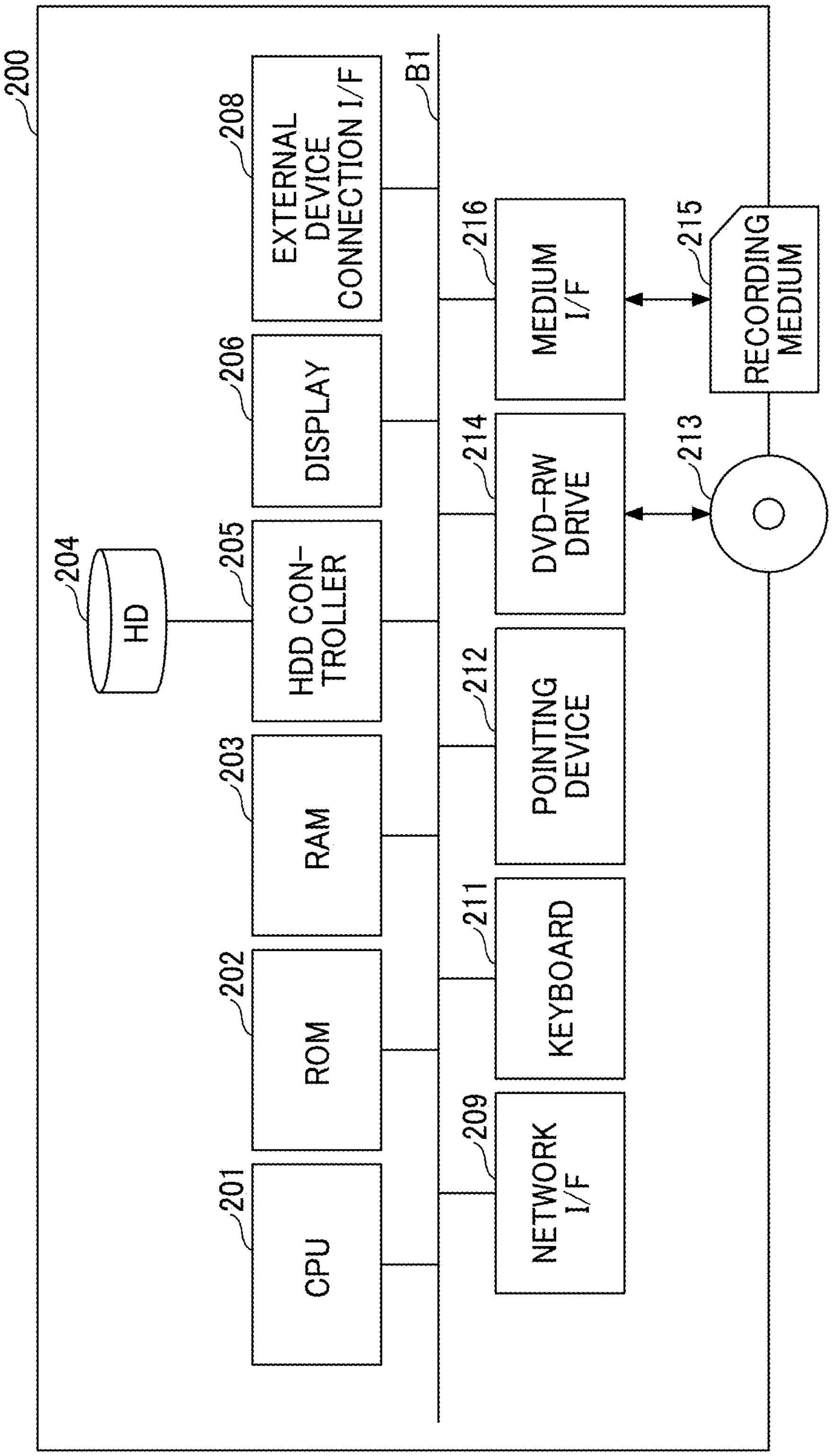
FIG. 12 is a block diagram illustrating an example of a hardware configuration of an information processing apparatus according to the exemplary embodiment of the disclosure.

Each apparatus or device included in the information processing system 100 of the present embodiment is described below. FIG. 12 is a block diagram illustrating an example of a hardware configuration of the information processing apparatus.

As illustrated in FIG. 12, the information processing apparatus 200 includes a central processing unit (CPU) 201, a read only memory (ROM) 202, a random access memory (RAM) 203, a hard disk (HD) 204, a hard disk drive (HDD) controller 205, a display 206, an external device connection interface (I/F) 208, a network I/F 209, a bus line B1, a keyboard 211, a pointing device 212, a digital versatile disc rewritable (DVD-RW) drive 214, and a medium I/F 216.

The CPU 201 controls the overall operation of the information processing apparatus 200. The ROM 202 stores a program such as an initial program loader (IPL) used for driving the CPU 201. The RAM 203 is used as a work area for the CPU 201. The HD 204 stores various data such as a control program. The HDD controller 205 controls reading or writing of various data from or to the HD 204 under the control of the CPU 201.

The display (display device) 206 displays various kinds of information such as a cursor, a menu, a window, characters, or an image. The external device connection I/F 208 is an interface for connecting various external devices. Examples of the external devices include, but not limited to, a universal serial bus (USB) memory and a printer. The network I/F 209 is an interface for performing data communication using a communication network. The bus line B1 is an address bus or a data bus, which electrically connects the components illustrated in FIG. 12 such as the CPU 201.

The keyboard 211 is an example of an input device provided with a plurality of keys for allowing a user to input characters, numerals, or various instructions. The pointing device 212 is an example of an input device that allows a user to select or execute a specific instruction, select a target for processing, or move a cursor being displayed. The DVD-RW drive 214 reads or writes various data from or to a DVD-RW 213, which is an example of a removable storage medium. The removable storage medium is not limited to the DVD-RW and may be a digital versatile disc-recordable (DVD-R) or the like. The medium I/F 216 controls reading or writing (storing) with respect to a recording medium 215 such as a flash memory.

Figure 13:
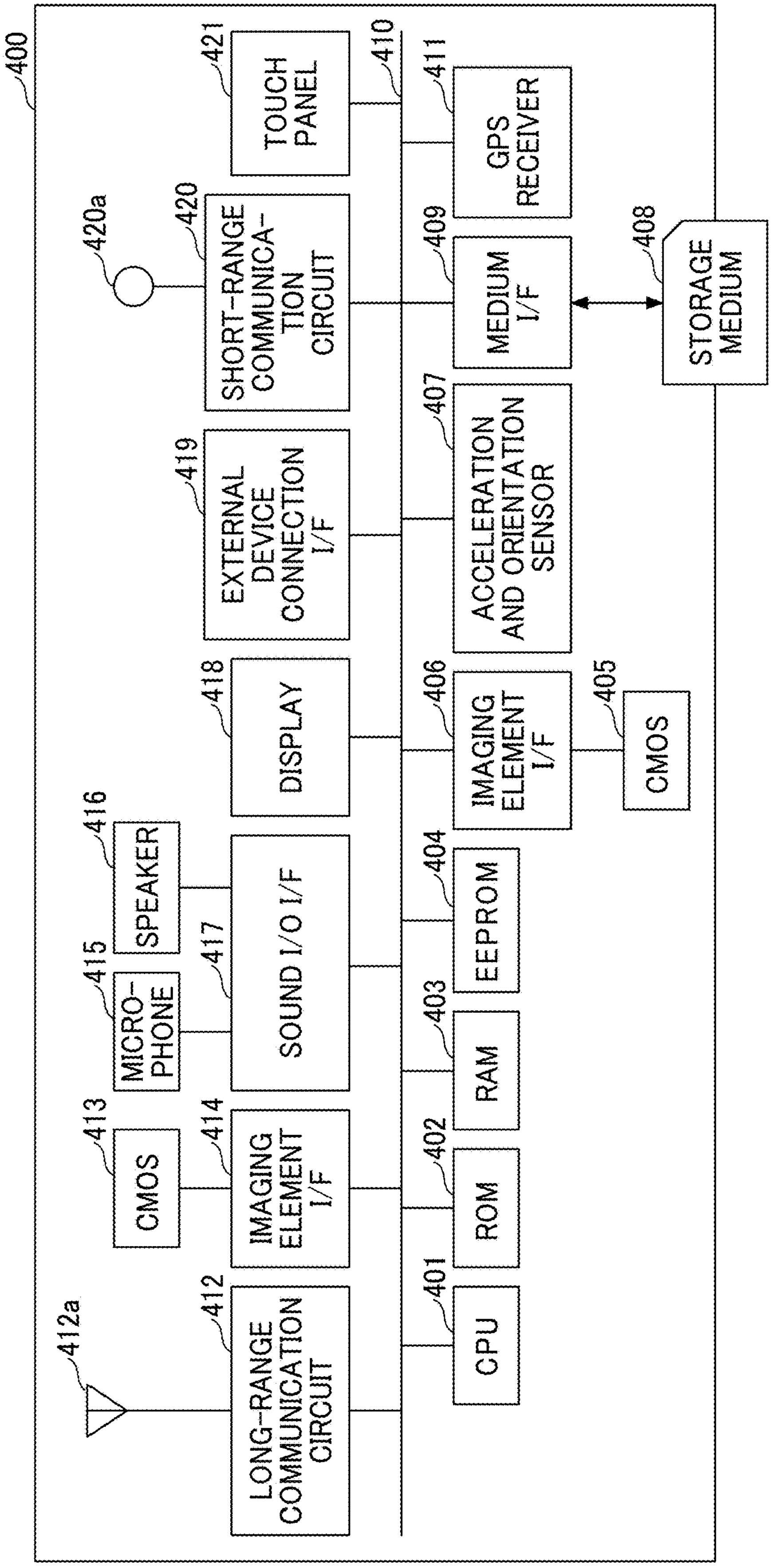
FIG. 13 is a block diagram illustrating a hardware configuration of a terminal device according to the exemplary embodiment of the disclosure.

FIG. 13 is a block diagram illustrating a hardware configuration of the terminal device 400 according to the present embodiment. FIG. 13 illustrates a hardware configuration of the terminal device 400 in a case where a smartphone is used as the terminal device 400.

As illustrated in FIG. 13, the terminal device 400 includes a CPU 401, a ROM 402, a RAM 403, an electrically erasable and programmable ROM (EEPROM) 404, a complementary metal oxide semiconductor (CMOS) sensor 405, an imaging element I/F 406, an acceleration and orientation sensor 407, a medium IF 409 and a Global Positioning System (GPS) receiver 411.

The CPU 401 controls the operation of the entire terminal device 400. The ROM 402 stores a program such as an initial program loader (IPL) to boot the CPU 401.

The RAM 403 is used as a work area for the CPU 401. The EEPROM 404 reads or writes various data such as a control program for the smartphone under the control of the CPU 401.

The CMOS sensor 405 is an example of a built-in imaging device configured to capture an object (mainly, a self-image of a user) under the control of the CPU 401 to obtain image data. In alternative to the CMOS sensor 405, an imaging element such as a charge-coupled device (CCD) sensor may be used. The imaging element I/F 406 is a circuit that controls driving of the CMOS sensor 405. The acceleration and orientation sensor 407 includes various sensors such as an electromagnetic compass for detecting geomagnetism, a gyrocompass, and an acceleration sensor. The medium I/F 409 controls reading or writing (storage) of data to a storage medium 408 such as a flash memory. The GPS receiver 411 receives a GPS signal from a GPS satellite.

In addition, the terminal device 400 includes a long-range communication circuit 412, a CMOS sensor 413, an imaging element I/F 414, a microphone 415, a speaker 416, a sound input/output (11O) I/F 417, a display 418, an external device connection I/F 419, a short-range communication circuit 420, an antenna 420*a* of the short-range communication circuit 420, and a touch panel 421.

The long-range communication circuit 412 is a circuit that communicates with another device by an antenna 412*a* through a communication network. The CMOS sensor 413 is a kind of built-in imaging unit that captures an image of a subject under the control of the CPU 401. The imaging element I/F 414 is a circuit that controls driving of the CMOS sensor 413. The microphone 415 is a built-in circuit that converts sound into an electric signal. The speaker 416 is a built-in circuit that generates sound such as music or speech (voice) by converting an electric signal into physical vibration.

The sound input/output I/F 417 is a circuit for inputting and outputting an audio signal between the microphone 415 and the speaker 416 under the control of the CPU 401. The display 418 is an example of a display device that displays an image of an object, various icons, etc. Examples of the display 418 include, but are not limited to, a liquid crystal display (LCD) and an organic electroluminescence (EL) display. The external device connection I/F 419 is an interface for connecting various external devices. The short-range communication circuit 420 is a communication circuit that communicates in compliance with the near field communication (NFC) or BLUETOOTH, for example. The touch panel 421 is an example of an input device that allows a user to input a user instruction to the terminal device 400 through touching a screen of the display 418.

The terminal device 400 also includes a bus line 410. The bus line 410 includes an address bus and a data bus and electrically connects the components illustrated in FIG. 13, such as the CPU 401, to each other.

Figure 14:
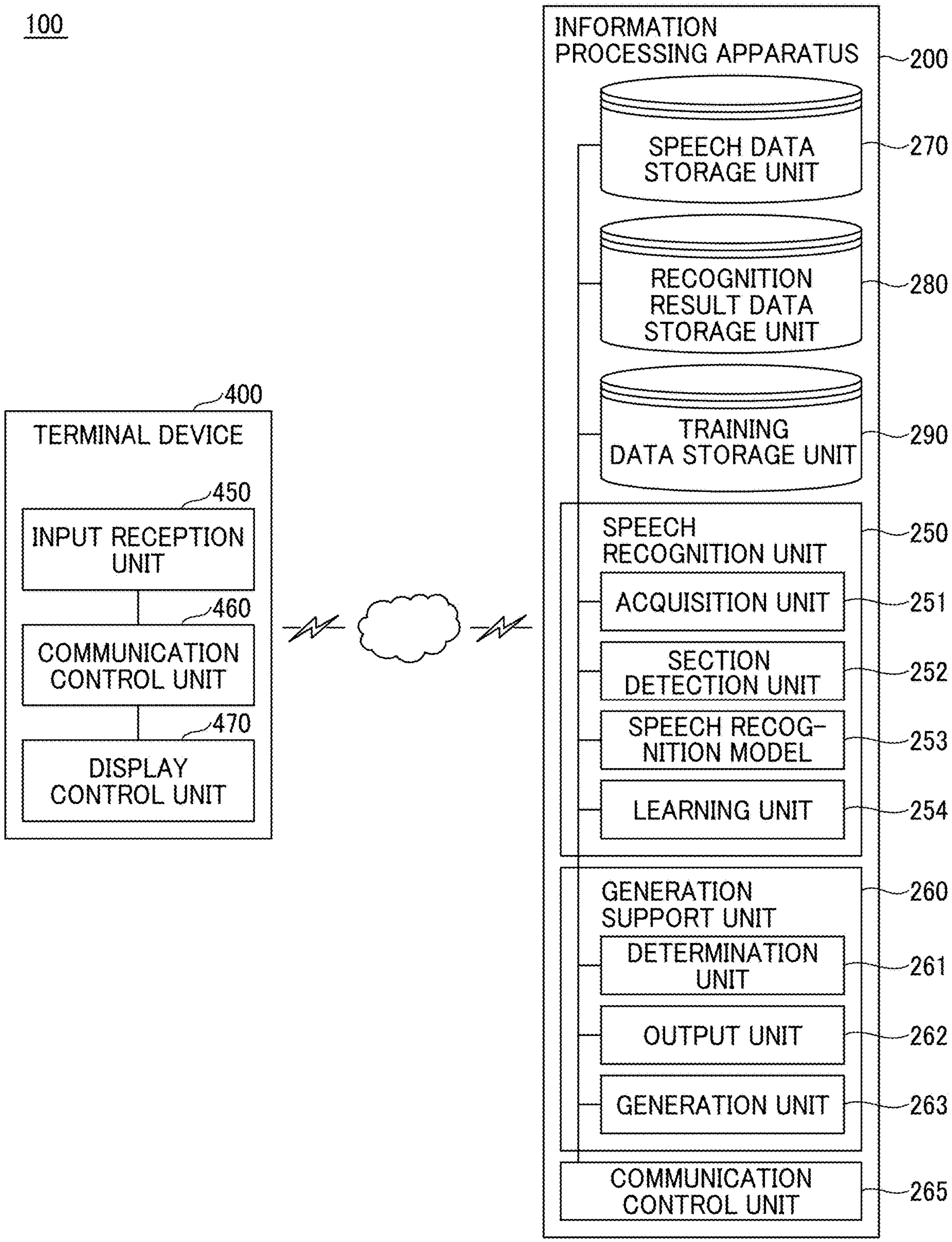
FIG. 14 is a block diagram illustrating a functional configuration of each device included in the information processing system according to the exemplary embodiment of the disclosure.

A functional configuration of each apparatus or device included in the information processing system 100 is described below with reference to FIG. 14. FIG. 14 is a block diagram illustrating a functional configuration of each apparatus or device included in the information processing system according to the present embodiment.

First, a functional configuration of the information processing apparatus 200 is described below. The information processing apparatus 200 according to the present embodiment includes the speech recognition unit 250, the generation support unit 260, a communication control unit 265, a speech data storage unit 270, a recognition result data storage unit 280, and a training data storage unit 290. The speech recognition unit 250 and the generation support unit 260 are implemented by the CPU 201 of the information processing apparatus 200 reading and executing a program stored in the HD 204. The speech data storage unit 270, the recognition result data storage unit 280, and the training data storage unit 290 are implemented by a storage area of the HD 204.

In the information processing apparatus 200 according to the present embodiment, the speech data storage unit 270 stores speech data acquired by the information processing apparatus 200. The recognition result data storage unit 280 stores the recognition result data, which is a result of speech recognition processing by the speech recognition unit 250. Details of the recognition result data storage unit 280 will be described later.

In the recognition result data storage unit 280, recognition result data may be stored in association with the speech data specified by the utterance ID for each utterance section. In addition, in the present embodiment, an utterance ID for each utterance section may be assigned to speech data stored in the speech data storage unit 270. In the present embodiment, the recognition result data for each utterance section and the speech data for each utterance section may be associated with each other by the utterance ID.

In addition, in the recognition result data storage unit 280, recognition result data may be stored in association with information indicating whether the recognition result data is a candidate for the training data or not. In other words, in the recognition result data storage unit 280, the recognition result data may be stored in association with information indicating a determination result by the determination unit 261, which will be described later.

The training data storage unit 290 stores training data generated by the generation unit 263, which will be described later. The training data may be data in which speech data and a character string converted from the speech data are associated with each other.

The speech recognition unit 250 includes an acquisition unit 251, a section detection unit 252, a speech recognition model 253, and a learning unit 254. The acquisition unit 251 acquires the speech data. The speech data acquired by the acquisition unit 251 may be speech data read from the speech data storage unit 270 or speech data acquired from an external device of the information processing system 100. When the speech data is acquired from an external device of the information processing system 100, the acquisition unit 251 may store the acquired speech data in the speech data storage unit 270.

The section detection unit 252 detects an utterance section from the utterance related to the acquired speech data. The utterance section indicates a section corresponding to a period of time during which an utterance is made. When detecting an utterance section in the speech data, the section detection unit 252 of the present embodiment may assign an utterance ID to the specified utterance section and associate the start time and the end time of the utterance section with the utterance ID.

The speech recognition model 253 may be a speech recognizer that performs speech recognition processing on speech data acquired in a state in which a distance between the mouth of a speaker and a sound collection device such as a microphone is a certain distance or more, and acquires a character string (text) as a result of the speech recognition processing. In other words, the speech recognition model 253 according to the present embodiment may be a speech recognizer that performs speech recognition on speech data acquired in the Far Field and converts the speech data into a character string.

Details of the speech recognition model 253 will be described later.

The character string acquired by the speech recognition model 253 may be stored in the recognition result data storage unit 280 as recognition result data associated with the utterance ID and the start time and the end time of the utterance section.

Specifically, the speech data acquired in the Far Field is, for example, speech data collected using a desktop microphone such as a boundary microphone.

When training data stored in the training data storage unit 290 is input, the learning unit 254 causes the speech recognition model 253 to learn.

The generation support unit 260 includes a determination unit 261, an output unit 262, and a generation unit 263. The determination unit 261 determines whether the utterance in the utterance section specified by the speech ID included in the recognition result data satisfies any one of the specific conditions. In other words, the determination unit 261 determines whether to set the recognition result data to a candidate for the training data or not, based on the information indicating the specific condition. The information indicating the specific condition may be held in the determination unit 261.

The output unit 262 outputs to the terminal device 400 the recognition result data along with the information indicating the result of the determination by the determination unit 261. In other words, the determination unit 261 outputs the recognition result data set to a candidate for the training data and the recognition result data that is excluded from the candidates for the training data to the terminal device 400.

The generation unit 263 generates the training data from the recognition result data in response to an operation performed with the terminal device 400 and stores the training data in the training data storage unit 290. Specifically, when the recognition result data is selected with the terminal device 400, the generation unit 263 generates the training data in which the character string converted from speech data included in the selected recognition result data is associated with the speech data corresponding to the recognition result data.

The communication control unit 265 controls communication between the information processing apparatus 200 and an external device. Specifically, the communication control unit 265 controls communication between the information processing apparatus 200 and the terminal device 400.

A functional configuration of the terminal device 400 is described. The terminal device 400 includes an input reception unit 450, a communication control unit 460, and a display control unit 470.

The input reception unit 450 receives various inputs to the terminal device 400. Specifically, the input reception unit 450 receives selection of a candidate for the training data displayed on the terminal device 400. The communication control unit 460 controls communication between the terminal device 400 and an external device. The display control unit 470 controls various types of display on the display 418 of the terminal device 400. Specifically, the display control unit 470 causes the display 418 to display a list screen including the recognition result data set to the candidate for the training data and the recognition result data that is excluded from the candidates for the training data.

The recognition result data storage unit 280 of the present embodiment is described with reference to FIG. 15. FIG. 15 is a diagram illustrating an example of the recognition result data storage unit.

The recognition result data stored in the recognition result data storage unit 280 according to the present embodiment includes information items of utterance ID, start time, end time, and utterance content, and the item "UTTERANCE ID" is associated with the items "START TIME", "END TIME", and "TEXT."

The value of the item of "UTTERANCE ID" is identification information for identifying speech data obtained for an utterance section specified by a start time and an end time.

The values of the items of "start time" and "end time" indicate a start time of an utterance section and an end time of the utterance section, respectively. The value of the item "text" is a character string acquired by the speech recognition model 253 performing speech recognition processing on speech data specified by an utterance ID. In other words, the value of the item "text" indicates a character string converted from the speech data.

In the recognition result data storage unit 280, information indicating a determination result by the determination unit 261 may be assigned to each recognition result data.

Figure 16:
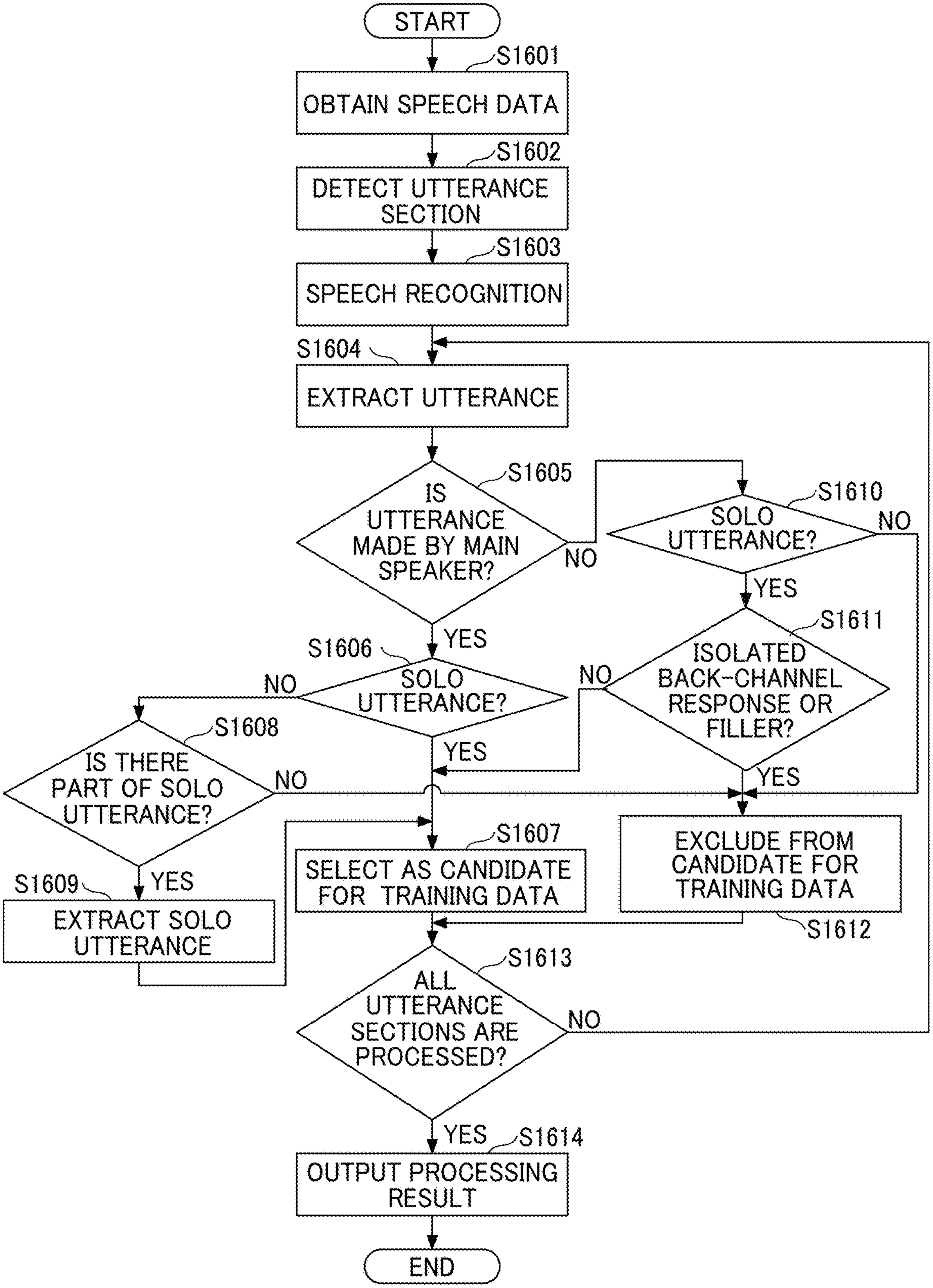
FIG. 16 is a flowchart illustrating an example of a process performed by the information processing apparatus according to the exemplary embodiment of the disclosure.

Referring to FIG. 16, a process performed by the information processing apparatus 200 according to the present embodiment is described.

FIG. 16 is a flowchart illustrating an example of a process performed by the information processing apparatus according to the present embodiment.

In the information processing apparatus 200 according to the present embodiment, the acquisition unit 251 of the speech recognition unit 250 acquires speech data (step S1601). Subsequently, the speech recognition unit 250 detects an utterance section by the section detection unit 252 (step S1602). Subsequently, the speech recognition unit 250 acquires a character string from the speech data corresponding to the detected utterance section through the speech recognition processing by the speech recognition model 253 (step S1603). At this point, recognition result data in which the utterance ID, the start time and the end time of the utterance section, and the character string converted from the speech data are associated with each other may be stored in the recognition result data storage unit 280.

Note that the processing from step S1601 to step S1603 in FIG. 16 may be executed at an independent timing separately from the processing after step S1604 in FIG. 16. In other words, in the present embodiment, the processing of the speech recognition unit 250 is executed before the processing of the generation support unit 260, which corresponds to the processing of step S1604 and subsequent steps illustrated in FIG. 16.

Next, in the information processing apparatus 200, the determination unit 261 of the generation support unit 260 extracts an utterance in the utterance section (step S1604). In other words, the determination unit 261 extracts speech data in the utterance section specified by the utterance ID included in the recognition result data.

Subsequently, the determination unit 261 determines whether or not the extracted utterance is the utterance of the main speaker (step S1605). Specifically, the determination unit 261 may determine that the utterance is the utterance of the main speaker when the sound volume of the extracted speech data is less than the sound volume of the other utterance sections. Note that the magnitude of the sound volume of the speech data may be relative or absolute.

In step S1605, when the extracted utterance is not the utterance of the main speaker, the process performed by the information processing apparatus 200 proceeds to step S1610, which will be described later.

When a determination result of step S1605 indicates that the extracted utterance is the utterance of the main speaker, the determination unit 261 determines whether or not the utterance is a solo utterance (step S1606). In other words, in step S1606, the determination unit 261 determines whether or not the utterance in the extracted utterance section satisfies the condition 1 among the specific conditions.

Specifically, the determination unit 261 may determine whether or not the utterance is a solo utterance based on the certainty factor when the speech recognition processing is performed on the speech data. For example, when the utterance is simultaneous utterance, the utterance is unclear and the certainty factor decreases. Accordingly, in the present embodiment, when the certainty factor is greater than a predetermined threshold value, the utterance indicated by the speech data is determined as a solo utterance, and when the certainty factor is less than the threshold value, the utterance indicated by the speech data is determined as simultaneous utterance. The certainty factor may be a value indicating a statistical measure of how reliable prediction or output is.

In step S1606, when the utterance is a solo utterance, the determination unit 261 determines that the utterance satisfies the condition 1, selects the recognition result data including the utterance ID specifying the utterance section as a candidate for the training data (step S1607), and the process proceeds to step S1613, which will be described later. In other words, the determination unit 261 sets the utterance satisfying the condition 1 to a first utterance, and selects the utterance content of the first utterance as a candidate for the training data.

Specifically, the determination unit 261 sets a flag for the recognition result data including the utterance ID specifying the utterance section. The flag may be stored in association with the recognition result data in the recognition result data storage unit 280.

When the utterance is not determined as a solo utterance in step S1606, the determination unit 261 determines whether or not the utterance includes a part that is not simultaneous utterance (step S1608). In other words, the determination unit 261 determines whether or not the utterance includes a part that is a solo utterance. In other words, the determination unit 261 determines whether or not the utterance extracted in step S1604 satisfies the condition 3.

In step S1608, in a case where a part corresponding to a solo utterance is not included, that is, in a case where the utterance extracted in step S1604 does not satisfy the condition 3, the processing performed by the generation support unit 260 proceeds to step S1612, which will be described below.

In step S1608, when a part that is a solo utterance is included, that is, when the utterance extracted in step S1604 satisfies the condition 3, the determination unit 261 extracts the part that is a solo utterance from the utterance extracted in step S1604 (step S1609), and the process proceeds to step S1607. In other words, the determination unit 261 sets the utterance satisfying the condition 3 to the first utterance, and selects the utterance content of the first utterance as a candidate for the training data.

At this time, when the utterance overlapping with the utterance of the main speaker is an isolated back-channel response or an isolated filler, the solo utterance is not extracted and the utterance of the main speaker is used as the first utterance as it is.

In the substantially same manner as step S1606, the determination unit 261 may extract a part that is a solo utterance based on the certainty factor of the speech recognition processing being performed.

In addition, the determination unit 261 sets the utterance content corresponding to the solo utterance extracted in step S1609 among the utterances extracted in step S1604 to a candidate for the training data.

When a determination result of step S1606 indicates that the extracted utterance is not the utterance of the main speaker, the determination unit 261 determines whether or not the utterance is a solo utterance (step S1610). When a determination result of step S1610 indicates that the utterance is not a solo utterance, the processing performed by the generation support unit 260 proceeds to step S1612, which will be described later.

When the determination result of S1610 indicates that the utterance is a solo utterance, the determination unit 261 determines whether or not the utterance extracted in step S1604 is an isolated back-channel response or an isolated filler (step S1611). In other words, the determination unit 261 determines whether or not the utterance extracted in step S1604 satisfies the condition 2. In addition, the determination unit 261 may determine whether or not the utterance is an isolated back-channel response or an isolated filler based on a feature amount of the speech data corresponding to the extracted utterance.

In step S1611, when a determination result indicates that the utterance is not an isolated back-channel response or an isolated filler, the determination unit 261 determines that the utterance extracted in step S1604 satisfies the condition 2, and the process proceeds to step S1607. In other words, the determination unit 261 sets the utterance satisfying the condition 2 to the first utterance, and selects the utterance content of the first utterance as a candidate for the training data.

When the determination result of step S1611 indicates that the utterance is an isolated back-channel response or an isolated filler, the determination unit 261 determines that the utterance extracted in step S1604 does not satisfy the specific condition, excludes the recognition result data corresponding to the utterance from the candidates for the training data (step S1612), and the process proceeds to step S1613, which will be described later. In other words, the determination unit 261 determines the extracted utterance as the second utterance that does not satisfy the specific condition.

The information processing apparatus 200 determines whether or not the processing from Step S1602 to Step S1604 has been executed for all utterance sections detected in step S1612 (Step S1613). In step S1613, when the processing executed for all the utterance sections is not completed, the process performed by the information processing apparatus 200 returns to step S1604.

In step S1613, in step that the process has been executed for all the utterance sections, the output unit 262 outputs the recognition result data and the determination result obtained by the determination unit 261 to the terminal device 400 (step S1614), and the process ends.

In the example of FIG. 16, after all the utterance sections included in the speech data are detected, whether or not the utterance indicated by the speech data corresponding to each utterance section satisfies the specific condition is determined, but the order of the processing is not limited thereto. In the present embodiment, for example, whether or not the utterance indicated by the speech data corresponding to the detected utterance section satisfies the specific condition may be determined each time the utterance section included in the speech data is detected.

In addition, in FIG. 16, whether or not the utterance is a solo utterance is determined after whether or not the extracted utterance is an utterance of the main speaker is determined, but the order of processing is not limited thereto. For example, in the present embodiment, after an utterance is extracted, whether or not the utterance is a solo utterance may be determined before whether or not the speech is a speech of the main speaker is determined.

In the present embodiment, when the utterance satisfies the specific condition, the recognition result data corresponding to the utterance is set to a candidate for the training data. Alternatively, or additionally, in the present embodiment, when the utterance is an utterance of the main speaker, recognition result data of an utterance section corresponding to the utterance may be set to a candidate for the training data. In other words, regardless of whether the utterance is overlapping or the utterance is an isolated back-channel response or an isolated filler, when the speech is an utterance of the main speaker, the utterance content may be set to a candidate for the training data.

Referring to FIG. 17, an example of display of the terminal device 400 is described. FIG. 17 is a diagram illustrating an example of display of candidates for the training data.

A screen 171 illustrated in FIG. 17 is an example of a screen (first screen) displayed on the terminal device 400 based on the data output to the terminal device 400 in step S1614 of FIG. 16. The screen 171 may be displayed on the display 206 included in the information processing apparatus 200.

The screen 171 includes display areas 172, 173, and 174. In the display area 172, the recognition result data and the flag are displayed in association with each other. The flag is information indicating a determination result obtained by the determination unit 261.

The display area 173 displays information indicating whether or not the recognition result data displayed in the display area 172 has been selected by the user of the terminal device 400. In the display area 174, operation buttons for operating for displaying a page on the screen 171 are displayed.

In the display area 172, the flag "1" is assigned to the recognition result data including the utterance IDs "0010," "0012," "0014," and "0016." Accordingly, in the example of FIG. 17, the utterance content of the utterance (first utterance) specified by each of the utterance IDs "0010," "0012," "0014," and "0016" is set to a candidate for the training data.

The utterance specified by the utterance ID "0014" is an utterance in which a solo utterance part is present in the utterance that is an utterance of the main speaker and partially includes the simultaneous utterance. Accordingly, in the display area 172, in the utterance specified by the utterance ID "0014," the utterance content of the part that is not the simultaneous utterance, namely the solo utterance part, is set to a candidate for the training data.

In addition, in the display area 172, the flag "1" is not assigned to the recognition result data including the utterance IDs "0011," "0013," "0015," and "0017." Accordingly, in the example of FIG. 17, the utterance content of the utterance (second utterance) specified by each of the utterance IDs "0011," "0013," "0015," and "0017" is excluded from the candidates for the training data.

The above-described embodiment allows the user of the terminal device 400 to grasp the recognition result data set to the candidates for the training data and the recognition result data that is excluded from the candidates for the training data.

In addition, in the display area 173, a checkmark is displayed in association with the recognition result data including the utterance IDs "0010," "0012," "0014," and "0016." Accordingly, in the example of FIG. 17, the utterance content of the utterance (first utterance) specified by each of the utterance IDs "0010," "0012," "0014," and "0016" is selected for the training data by the user of the terminal device 400.

Note that, in the example of FIG. 17, the utterance content of the first utterance set to the candidate for the training data is selected for the training data, but on the screen 171, the utterance content of the second utterance excluded from the candidate for the training data may be selected as the training data.

In addition, on the screen 171, when the utterance ID included in the recognition result data displayed in the display area 172 is selected by the user of the terminal device 400, the speech data of the utterance section specified by the utterance ID may be reproduced. In this manner, by reproducing the speech data, the user of the terminal device 400 can confirm whether or not the utterance content of the utterance section set to the candidate for the training data is appropriate by a simple operation. In addition, the user of the terminal device 400 can select training data after confirming whether or not the character string acquired from the speech data is appropriate.

In addition, in the present embodiment, the screen 171 may be displayed in a manner that the utterance section of which the recognition result data is assigned with the flag "1" is preset with a status indicating being selected (a status indicated by a checkmark assigned), in the display area 173. In this case, in the display area 173, the selection may be canceled by an operation of the user. In addition, in the present embodiment, the screen 171 may be displayed in a manner that the utterance section of which the recognition result data is assigned with the flag "1" is preset with an unselected status (a state indicated by blank without a checkmark) in the display area 173.

In addition, in the present embodiment, when the user of the terminal device 400 selects a character string converted from speech data, on the screen 171, an editing screen for modifying the selected character string may be displayed. This allows the user to modify the character string, when there is an error in the character string converted from the speech data.

In addition, the screen 171 may be provided with an operation button for instructing the information processing apparatus 200 to generate training data. When this operation button is selected on the screen 171 after the selection of the recognition result data to be used for the training data is completed, the information processing apparatus 200 may generate the training data using the utterance content included in the recognition result data selected by the user.

Generating training data by the generation support unit 260 of the information processing apparatus 200 is described below. When the generation unit 263 selects the recognition result data to be the training data, the generation support unit 260 of the information processing apparatus 200 acquires the character string converted from the speech data included in the selected recognition result data from the recognition result data storage unit 280. In addition, the generation unit 263 acquires speech data associated with the utterance ID included in the selected recognition result data from the speech data storage unit 270. Then, the generation unit 263 generates the training data in which the acquired speech data is set to input data and the character string is set to ground truth data, and stores the training data in the training data storage unit 290.

As described above, in the present embodiment, the utterances that satisfy the specific condition is presented to the user of the terminal device 400 as the candidates for the training data, and the training data is generated using one or more of the candidates for training data selected by the user. As a result, the training data with high accuracy can be generated. In addition, according to the present embodiment, the user can generate the training data only by selecting from the presented candidates for the training data, and can support the generation of the training data.

Figure 18:
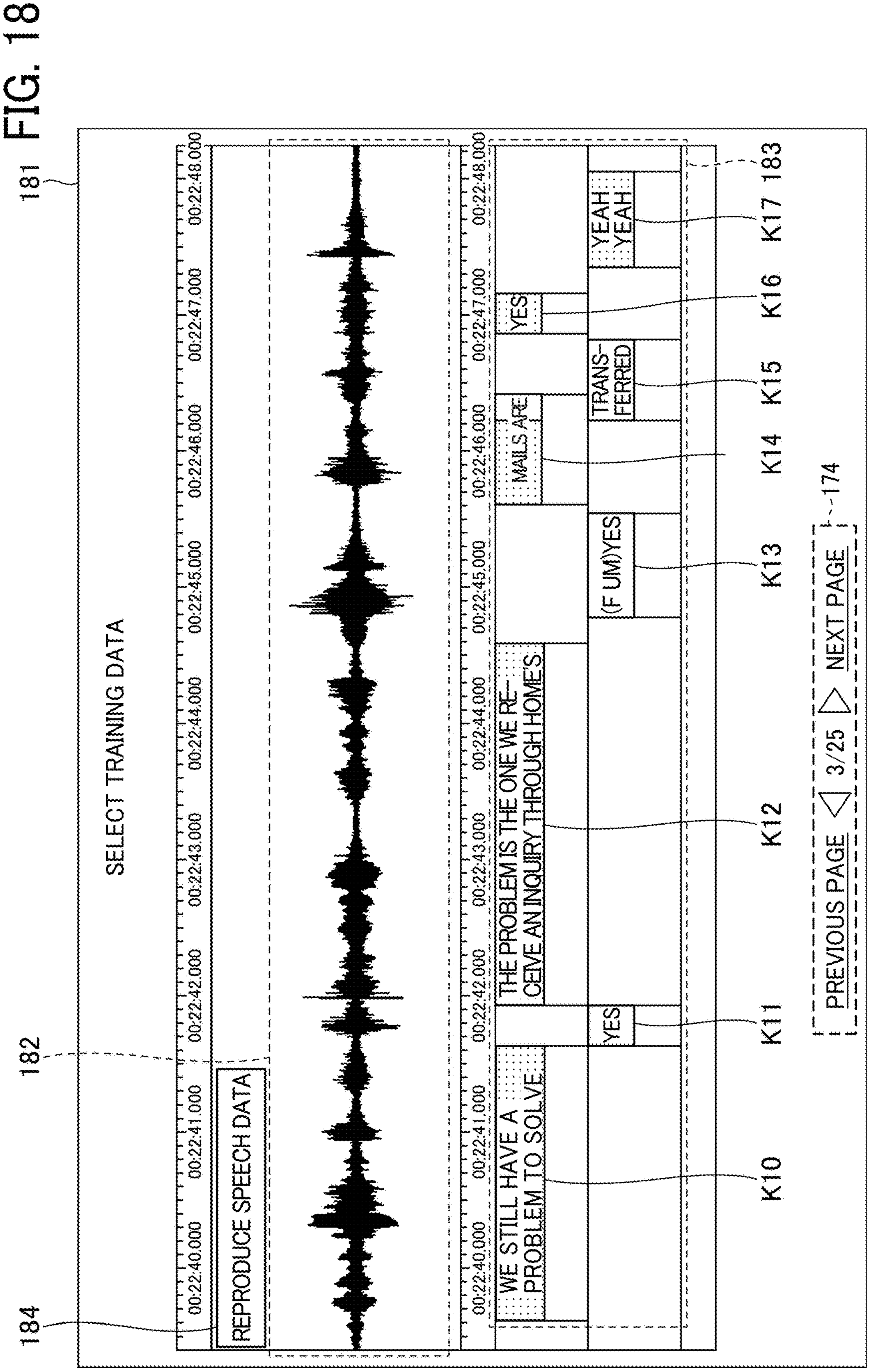
FIG. 18 is a diagram illustrating another example of display of candidates for training data according to the exemplary embodiment of the disclosure.

Referring to FIG. 18, another example of display displayed when outputting the candidates for the training data is described. FIG. 18 is a diagram illustrating an example of display of the candidates for the training data.

A screen 181 illustrated in FIG. 18 includes display areas 182, 183, and 174, and an operation button 184. In the display area 182, a waveform of the speech data subjected to the speech recognition processing is displayed. In the display area 183, the character string converted from the speech data is displayed in association with the waveform of the speech data for each utterance section.

In the display area 183 according to the present embodiment, the utterance content included in the recognition result data to which the flag "I" is assigned may be highlighted. In other words, in the display area 183, a display mode of the utterance content of the recognition result data set to a candidate for the training data may be set to be different form that of the utterance content of the recognition result data excluded from the candidates for the training data.

Specifically, in the display area 183, the utterance content corresponding to each of the utterance sections K10. K12. K14, and K17 is highlighted. Accordingly, the user of the terminal device 400 can recognize that the utterance content corresponding to each of the utterance sections K10, K12, K14, and K17 is the utterance content of the recognition result data selected as the candidates for the training data.

Since a part of the utterance in the utterance section K14 is the simultaneous utterance, the part "MAIL NOTIFICATION" that is a solo utterance is set to the candidate for the training data, and "MAIL NOTIFICATION" is highlighted in the character string converted from the speech data.

In addition, in the display area 183, the display mode of the utterance content may be changed according to the type of utterance such as whether the utterance in the utterance section is a solo utterance, simultaneous utterance, or an isolated back-channel response, or an isolated filler. In addition, in the display area 183, the display mode of the utterance content may be changed depending on whether or not the utterance is made by the main speaker.

In the example of FIG. 18, the utterance section K16 is an utterance made by the main speaker and is an isolated back-channel response. In addition, the utterance section K17 is an utterance made by a speaker other than the main speaker and is an isolated back-channel response. For this reason, the display mode of the utterance content of the utterance section K16 is different from the display mode of the utterance content of the utterance section K17. As described above, changing the display mode allows the user of the terminal device 400 to recognize the type of utterance.

In addition, in the display area 183, the utterance content may be selectable for each utterance section. In this case, in the display area 183, when the utterance content is selected by the user, the utterance section is surrounded by a frame line to be visually recognized as being selected as data to be the training data.

In addition, on the screen 181, an editing screen for modifying a character string may be displayed by selecting the character string converted from the speech data. In this way, when there is an error in the character string displayed in the display area 183, the erroneous character string can be modified. It is preferable that the operation of selecting the character string to display the editing screen is different from the operation of selecting the utterance content to be the training data.

Figure 19:
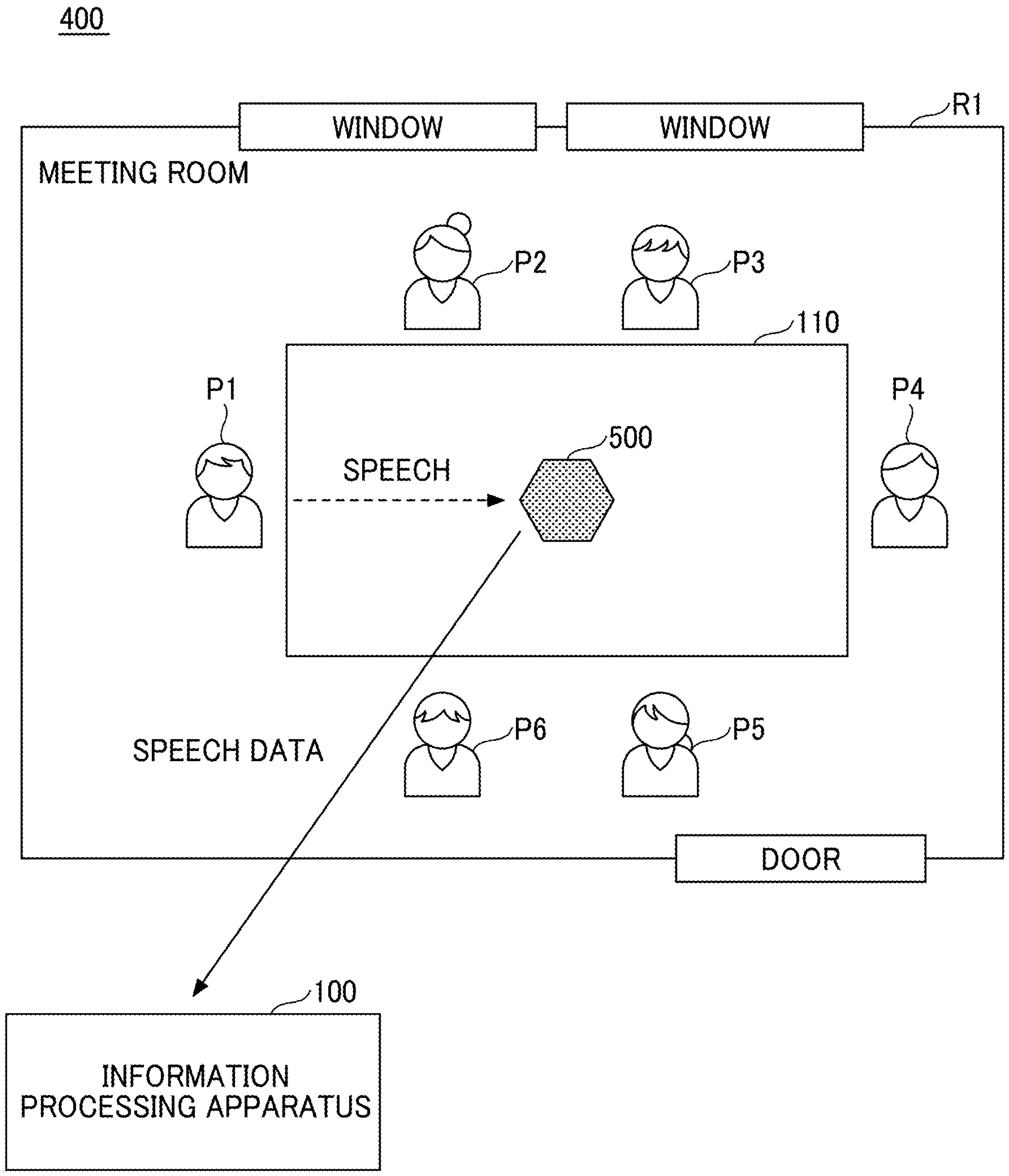
FIG. 19 is a diagram illustrating an example of a method of acquiring speech data according to the exemplary embodiment of the disclosure.

Referring to FIG. 19, a method of acquiring speech data obtained by speech recordings of utterances of a plurality of persons is described.

FIG. 19 is a diagram for describing a method of acquiring speech data according to the present embodiment. The example of a method of acquiring speech data illustrated in FIG. 19 is merely an example, and speech data obtained by speech recordings of utterances of a plurality of persons may be acquired by another method.

FIG. 19 illustrates a case that speech data during a meeting is recorded. Specifically, in FIG. 19, utterances of participants P1 to P6 of the meeting are collected by a desktop microphone 500 arranged on a table 110 of a meeting room R1.

The desktop microphone 500 may be a general sound collection device and may include a storage device that stores collected speech data and a communication device that transmits the speech data to the information processing apparatus 200.

The speech data collected by the desktop microphone 500 is transmitted to the information processing apparatus 200, and speech recognition processing is performed by the speech recognition unit 250.

The desktop microphone 500 is disposed at the center of the table 110 installed in the meeting room R1, and may be disposed at a position away from the mouth of each of the participants P1 to P6 by a predetermined distance or more. Accordingly, the speech data obtained by the desktop microphone 500 is speech data obtained in the Far Field.

In the present embodiment, as described above, the speech data including the utterances of the plurality of persons is acquired, and speech recognition processing is performed on the speech data.

As described above, in the present embodiment, speech recognition is performed to convert the speech data into a character string for each utterance section, and recognition result data of a speech recognition result is stored in the recognition result data storage unit 280 along with a result of determination as to whether or not the utterance in the utterance section satisfies a specific condition.

In this way, w % bat the worker who generates the training data does is just checking the result of the speech recognition for each utterance section stored in the recognition result data storage unit 280, thereby reducing the work load. Accordingly, in the present embodiment, the cost for generating the training data can be reduced.

In addition, in the present embodiment, since the training data can be efficiently generated, a sufficient amount of the training data can be provided for learning of the speech recognition model 253, and the accuracy of speech recognition by the speech recognition model 253 can be improved.

In the present embodiment, by supporting generation of training data as described above, highly accurate training data can be easily generated, and this can contribute to improvement in accuracy of speech recognition in machine learning.

The speech recognition model 253 according to the present embodiment is described. The speech recognition model 253 according to the present embodiment may include a deep neural network (DNN), and may be an End-to-End model.

The End-to-End model is a model in which an input speech is directly converted into characters via one neural network. Since the End-to-End model has a simple structure as compared with a speech recognition model according to a related art in which a plurality of components such as an acoustic model, a language model, and a pronunciation dictionary are individually optimized and combined, the End-to-End model has advantages such as easy implementation and high response speed.

In addition, compared with a conventional speech recognition model in which a plurality of components is individually optimized, with the End-to-End model can be efficient learning from ungrammatical speech data having large fluctuations, such as spoken language, can be achieved. The speech data that is ungrammatical and has large fluctuations, such as a spoken language, is, for example, speech data acquired in the Far Field.

Accordingly, the training data generated by the method of the present embodiment is useful training data in a case of learning in which the speech recognition model 253 is an End-to-End model.

In addition, in a speech recognition model according to a related art, a front end that performs acoustic processing (noise cancellation) is often mounted in a preceding stage, but in the case of an End-to-End model, noise cancellation is not performed, and learning using speech data including noise as it is can be easily performed.

Accordingly, when the speech recognition model 253 is an end-to-end model, the accuracy of speech recognition can be improved by learning of the speech recognition model 253 using the training data generated by the method according to the present embodiment.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The apparatuses or devices described in the embodiments described above are merely one example of plural computing environments that implement one or more embodiments of the disclosure.

In some embodiments, the information processing apparatus 200 includes multiple computing devices, such as a server cluster. The multiple computing devices are configured to communicate with one another through any type of communication link, including a network, a shared memory, etc., and perform the processes disclosed herein. In substantially the same manner, for example, the information processing apparatus 200 includes such multiple computing devices configured to communicate with one another.

In addition, information processing system 100 may be configured to share the disclosed processing steps in various combinations. For example, a process executed by the information processing apparatus 200 may be executed by another information processing apparatus. Similarly, the functions of the information processing apparatus 200 can be executed by another information processing apparatus. Each element of the information processing apparatus and another information processing apparatus may be integrated into a single information processing apparatus or may be divided into a plurality of devices.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure. Any one of the above-described operations may be performed in various other ways, for example, in an order different from the one described above.

In a related art, selecting an utterance to be training data (labeled training data) by checking speech data in order to generate the training data (labeled training data) may be burdensome for a worker, such as an annotator.

According to an embodiment of the present disclosure, selecting an utterance to be training data (labeled training data) is supported.

Aspects of the present disclosure are, for example, as follows.

Aspect 1

An information processing apparatus includes an acquisition unit to acquire speech data, a speech recognition unit to detect an utterance section in which an utterance is made, from a speech represented by the speech data, a determination unit to determine whether the utterance in the utterance section satisfies one or more conditions preset for outputting a candidate for training data, and an output unit to output a content of a first utterance in the utterance section as a candidate for the training data. The first utterance is determined to satisfy the one or more conditions by the determination unit.

Aspect 2

In the information processing apparatus according to Aspect 1, the output unit outputs a first screen displaying the content of the first utterance as the candidate for the training data.

Aspect 3

In the information processing apparatus according to Aspect 2, the content of the first utterance is displayed on the first screen as an utterance content to be the training data to be generated. The content of the first utterance is selectable on the first screen.

The information processing apparatus according to Aspect 2 further includes a generation unit to generate the training data based on the content of the first utterance selected on the first screen according to a user operation.

Aspect 4

In the information processing apparatus according to Aspect 2 or Aspect 3, the first screen further includes a content of a second utterance in the utterance section. The content of the second utterance is determined not to satisfy the one or more conditions by the determination unit, and is selectable as an utterance content to be used for the training data.

The generation unit generates the training data based on the content of the second utterance when the content of the second utterance is selected on the first screen according to a user operation.

Aspect 5

In the information processing apparatus according to Aspect 4, the first screen is a screen that identifiably displays, or displays in an identifiable manner, that the content of the first utterance is the candidate for the training data among the content of the first utterance and the content of the second utterance.

Aspect 6

In the information processing apparatus according to Aspect 4 or Aspect 5, the first screen is a screen on which the speech data corresponding to the content of the first utterance and the content of the second utterance is reproducible.

Aspect 7

In the information processing apparatus according to any one of Aspect 1 to Aspect 6, the utterance content of the utterance section includes at least the speech data corresponding to the utterance section and a character string obtained by converting the speech data.

Aspect 8

In the information processing apparatus according to any one of Aspect 1 to Aspect 7, the speech data is speech data related to speech recordings of a conversation between a plurality of speakers including a main speaker.

Aspect 9

In the information processing apparatus according to Aspect 8, the one or more conditions include a condition that the utterance is made by the main speaker.

Aspect 10

In the information processing apparatus according to Aspect 8 or Aspect 9, the one or more conditions include another condition that the utterance is made by the main speaker and lacks simultaneous utterance in which an utterance and another utterance temporally overlap each other Aspect 11

In the information processing apparatus according to any one of Aspect 8 to Aspect 10, the one or more conditions include still another condition that the utterance is made by a speaker other than the main speaker and includes at least a type of utterance other than a back-channel response and a filler.

Aspect 12

In the information processing apparatus according to any one of Aspect 8 to Aspect 11, the one or more conditions include still another condition that the utterance is made by the main speaker, includes a part corresponding to simultaneous utterance in which an utterance and another utterance temporally overlap each other, and includes another part that lacks the simultaneous utterance.

Aspect 13

In the information processing apparatus according to Aspect 12, in a case that the utterance in the utterance section detected by the determination unit is made by the main speaker, includes the part corresponding to the simultaneous utterance in which an utterance and another utterance temporally overlap each other, and includes the part that lacks the simultaneous utterance, the output unit outputs the part that lacks the simultaneous utterance as the candidate for the training data.

Aspect 14

In the information processing apparatus according to any one of Aspect 1 to Aspect 13, the one or more conditions are set according to a user operation.

Aspect 15

An information processing method performed by an information processing apparatus, includes obtaining speech data, detecting an utterance section in which an utterance is made, from a speech represented by the speech data, determining whether the utterance in the utterance section satisfies one or more conditions preset for outputting a candidate for training data, and outputting a content of a first utterance determined to satisfy the one or more conditions in the utterance section as a candidate for the training data.

Aspect 16

A non-transitory recording medium storing a plurality of instructions which, when executed by one or more processors of an information processing apparatus, causes the processors to perform a method. The method includes obtaining speech data, detecting an utterance section in which an utterance is made, from a speech represented by the speech data, determining whether the utterance in the utterance section satisfies one or more conditions preset for outputting a candidate for training data, and outputting a content of a first utterance determined to satisfy the one or more conditions in the utterance section as a candidate for the training data.

The invention claimed is:

1. An information processing apparatus, comprising:

circuitry configured to:

obtain speech data;

detect, from a speech represented by the speech data, an utterance section in which an utterance is made;

determine whether the utterance in the utterance section satisfies one or more condition preset for outputting a candidate for training data for machine learning; and output a screen to display a content of at least a part of the utterance in the utterance section as the candidate for the training data for machine learning, the at least the part of the utterance being determined to satisfy the one or more condition, wherein the speech data is related to one or more utterances of a plurality of speakers in a conversation, the one or more utterances include the utterance, the plurality of speakers include a main speaker, and the one or more condition includes a condition that the utterance is made by one of the plurality of speakers other than the main speaker and includes at least a type of utterance other than a back-channel response and a filler.

2. The information processing apparatus of claim 1, wherein the content of the at least the part of the utterance displayed on the screen is selectable for the training data for machine learning to be generated, and the circuitry is further configured to generate the training data for machine learning based on the content of the at least the part of the utterance selected according to a user operation performed on the screen.

3. The information processing apparatus of claim 2, wherein the utterance in the utterance section includes a first utterance and a second utterance, the first utterance is the at least the part of the utterance, the screen further includes another content of the second utterance determined not to satisfy the one or more condition, the other content of the second utterance is selectable on the screen to be used for the training data for machine learning, and the circuitry is configured to generate the training data for machine learning based on the other content of the second utterance in response to another user operation performed on the screen to select the other content of the second utterance.

4. The information processing apparatus of claim 3, wherein the circuitry is further configured to display, on the screen and in an identifiable manner, that the content of the first utterance is the candidate for the training data for machine learning among the content of the first utterance and the other content of the second utterance.

5. The information processing apparatus of claim 3, wherein the speech data corresponding to each of the content of the first utterance and the other content of the second utterance is reproducible via the screen.

6. The information processing apparatus of claim 1, wherein the content of the at least the part of the utterance in the utterance section includes at least one of the speech data corresponding to the utterance section or a character string obtained by converting the speech data corresponding to the utterance section.

7. The information processing apparatus of claim 1, wherein the one or more condition includes a further condition that a further utterance of the one or more utterances is made by the main speaker.

8. The information processing apparatus of claim 1 wherein the one or more condition includes a further condition that a further utterance of the one or more utterances is made by the main speaker and lacks simultaneous utterance in which the further utterance and another utterance temporally overlap each other.

9. The information processing apparatus of claim 1, wherein the one or more condition includes a further condition that a further utterance of the one or more utterances:

is made by the main speaker, includes a part corresponding to a simultaneous utterance in which the further utterance and another utterance temporally overlap each other, and includes another part that lacks the simultaneous utterance.

10. The information processing apparatus of claim 9, wherein the circuitry is configured to output the other part that lacks the simultaneous utterance as a further candidate for the training data for machine learning based on a determination result indicating that the further utterance is:

made by the main speaker, includes the part corresponding to the simultaneous utterance, and includes the other part that lacks the simultaneous utterance.

11. The information processing apparatus of claim 1, wherein the one or more condition is set according to a user operation.

12. An information processing method, comprising:

obtaining speech data;

detecting, from a speech represented by the speech data, an utterance section in which an utterance is made;

determining whether the utterance in the utterance section satisfies one or more condition preset for outputting a candidate for training data for machine learning; and outputting a screen to display a content of at least a part of the utterance in the utterance section as the candidate for the training data for machine learning, the at least the part of the utterance being determined to satisfy the one or more condition, wherein the speech data is related to one or more utterances of a plurality of speakers in a conversation, the one or more utterances include the utterance, the plurality of speakers include a main speaker, and the one or more condition includes a condition that the utterance is made by one of the plurality of speakers other than the main speaker and includes at least a type of utterance other than a back-channel response and a filler.

13. A non-transitory recording medium storing a plurality of instructions which, when executed by one or more processors of an information processing apparatus, cause the processors to perform a method, the method comprising:

obtaining speech data;

detecting, from a speech represented by the speech data, an utterance section in which an utterance is made;

determining whether the utterance in the utterance section satisfies one or more condition preset for outputting a candidate for training data for machine learning; and outputting a screen to display a content of at least a part of the utterance in the utterance section as the candidate for the training data for machine learning, the at least the part of the utterance being determined to satisfy the one or more condition, wherein the speech data is related to one or more utterances of a plurality of speakers in a conversation, the one or more utterances include the utterance, the plurality of speakers include a main speaker, and the one or more condition includes a condition that the utterance is made by one of the plurality of speakers other than the main speaker and includes at least a type of utterance other than a back-channel response and a filler.

* * * * *